US011423510B2

(12) United States Patent
Ranade et al.

(10) Patent No.: US 11,423,510 B2
(45) Date of Patent: Aug. 23, 2022

(54) SYSTEM AND METHOD FOR PROVIDING DOLLY ZOOM VIEW SYNTHESIS

(71) Applicant: Samsung Electronics Co., Ltd., Gyeonggi-do (KR)

(72) Inventors: Rohit R. Ranade, Campbell, CA (US); Yangwen Liang, San Diego, CA (US); Shuangquan Wang, San Diego, CA (US); Dongwoon Bai, San Diego, CA (US); Jungwon Lee, San Diego, CA (US)

(73) Assignee: Samsung Electronics Co., Ltd

( * ) Notice: Subject to any disclaimer, the term of this patent is extended or adjusted under 35 U.S.C. 154(b) by 102 days.

(21) Appl. No.: 16/814,184

(22) Filed: Mar. 10, 2020

(65) Prior Publication Data
US 2021/0125307 A1    Apr. 29, 2021

Related U.S. Application Data

(60) Provisional application No. 62/926,858, filed on Oct. 28, 2019.

(51) Int. Cl.
*G06T 7/55* (2017.01)
*G06T 3/00* (2006.01)
*G06T 3/40* (2006.01)
*G06T 5/00* (2006.01)

(52) U.S. Cl.
CPC ............. *G06T 3/40* (2013.01); *G06T 3/0093* (2013.01); *G06T 5/005* (2013.01); *G06T 7/55* (2017.01); *G06T 2207/10028* (2013.01); *G06T 2207/20032* (2013.01); *G06T 2207/20221* (2013.01)

(58) Field of Classification Search
None
See application file for complete search history.

(56) References Cited

U.S. PATENT DOCUMENTS

| 8,971,625 B2 | 3/2015 | Pitts et al. |
| 9,025,051 B2 | 5/2015 | Pylvanainen et al. |
| 2015/0055886 A1 | 2/2015 | Oh et al. |
| 2015/0146029 A1 | 5/2015 | Venkataraman et al. |
| 2016/0381341 A1 | 12/2016 | El Choubassi et al. |

(Continued)

FOREIGN PATENT DOCUMENTS

WO   WO 2014/131941    9/2014

OTHER PUBLICATIONS

Wikipedia, "Dolly zoom", Feb. 20, 2020, https://en.wikipedia.org/wiki/Dolly_zoom, pp. 2.

*Primary Examiner* — Kyle Zhai
(74) *Attorney, Agent, or Firm* — The Farrell Law Firm, P.C.

(57) ABSTRACT

A method and an apparatus are provided for providing a dolly zoom effect by an electronic device. A first image with a first depth map and a second image with a second depth map are obtained. A first synthesized image and a corresponding first synthesized depth map are generated using the first image and the first depth map respectively. A second synthesized image and a corresponding second synthesized depth map are generated using the second image and the second depth map respectively. A fused image is generated from the first synthesized image and the second synthesized image. A fused depth map is generated from the first synthesized depth map and the second synthesized depth map. A final synthesized image is generated based on processing the fused image and the fused depth map.

20 Claims, 21 Drawing Sheets

(56) References Cited

U.S. PATENT DOCUMENTS

| | | |
|---|---|---|
| 2018/0160046 A1 | 6/2018 | Nash et al. |
| 2018/0176532 A1 | 6/2018 | Gallo et al. |
| 2018/0352165 A1 | 12/2018 | Zhen et al. |

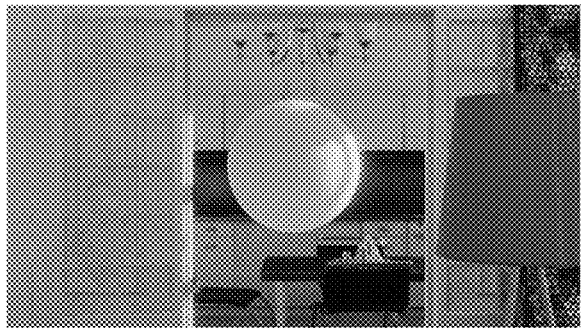 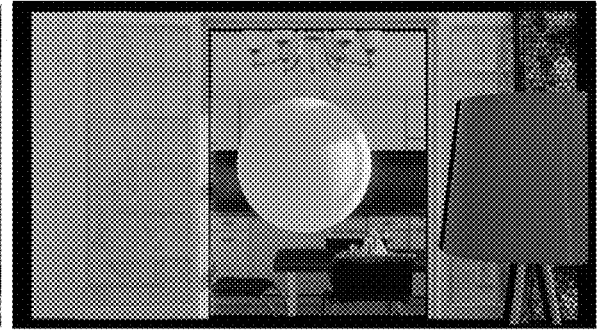
FIG. 4A  FIG. 4B
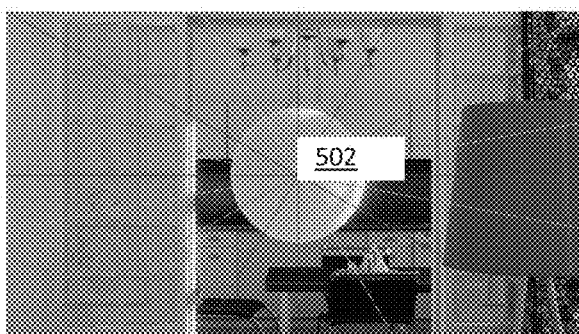 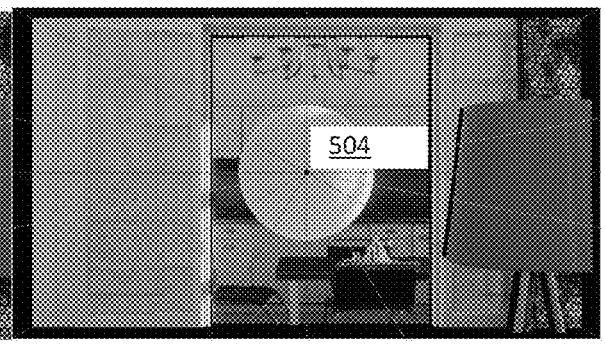
FIG. 5A  FIG. 5B

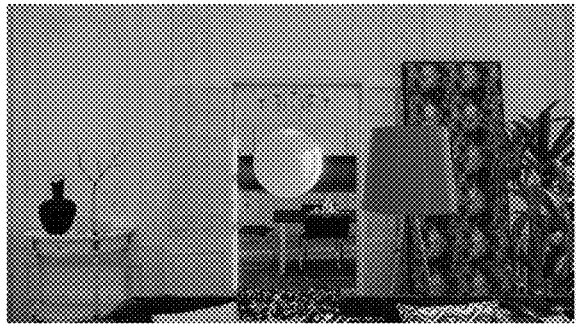
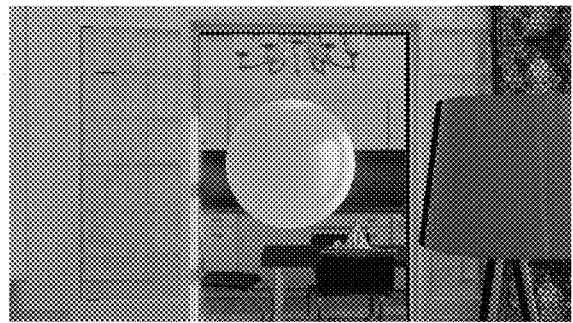
FIG. 7A FIG. 7B
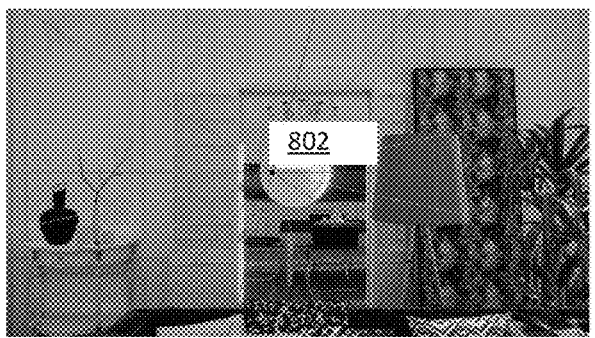
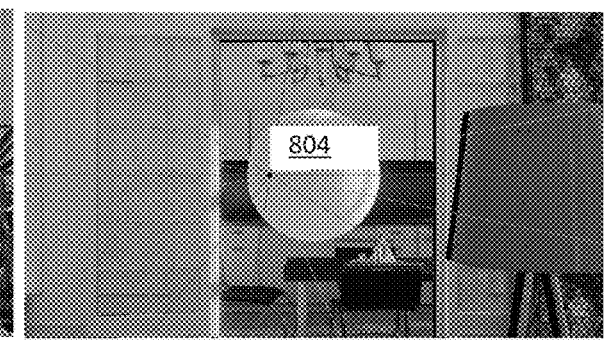
FIG. 8A FIG. 8B

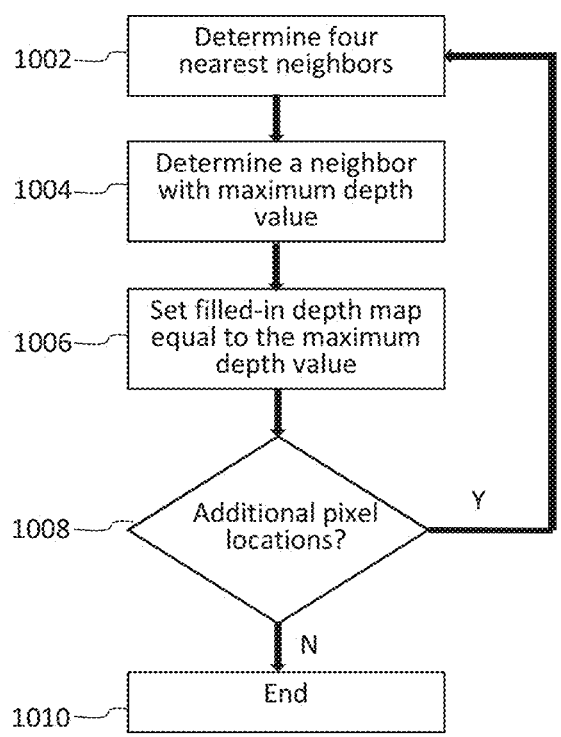

SYSTEM AND METHOD FOR PROVIDING DOLLY ZOOM VIEW SYNTHESIS

PRIORITY

This application is based on and claims priority under 35 U.S.C. § 119(e) to a U.S. Provisional Patent Application filed on Oct. 28, 2019 in the United States Patent and Trademark Office and assigned Ser. No. 62/926,858 the contents of which are incorporated herein by reference.

FIELD

The present disclosure relates generally to a digital image processing system, and more particularly, to a method and system for providing dolly zoom view synthesis by an electronic device.

BACKGROUND

The dolly zoom effect is typically achieved by zooming a zoom lens in or out in order to adjust a field of view (FoV), while simultaneously moving the camera away from or towards a subject in order to keep the subject relatively the same size throughout. This leads to a continuous perspective distortion, with the most directly noticeable feature being that the background appears to change size relative to the subject. The visual appearance for the viewer is that the background grows in size and detail to simulate an overwhelming of the foreground, or the foreground begins to dominate, depending on the way in which the effect is executed.

The dolly zoom effect may also be referred to as vertigo effect, focus disturbance zoom, zido, zolly, hunter smith shot, hitchcock shot, hitchcock zoom, vertigo zoom, jaws shot, reverse tracking shot, triple reverse zoom, back zoom travelling, smash zoom, telescoping, trombone shot, push/pull, long pull, reverse pull, trombone effect, stretch shot, forward zoom, reverse tracking, zoom in/dolly out, trans-tray, and contra-zoom.

FIGS. 1A and 1B are diagrams illustrating the dolly zoom effect. In FIG. 1A, the camera is at "position A" with a FoV $\theta_1$ and an object 102 is under focus. In FIG. 1B, the camera moves to "position B" while increasing its FoV to $\theta_2$, where position B is closer than position A to the object 102. After such a camera movement, the size of the object 102 remains the same, while the sizes of background objects 104 and 106 appear to shrink as more objects are brought into the image due to the increased FoV.

Execution of the effect requires skill and equipment, because of the requirement of simultaneous zooming and movement. It is especially difficult to execute the dolly zoom effect on mobile phone cameras, because fine control of image zoom, object tracking, and movement is required.

SUMMARY

According to one embodiment, a method is provided for providing a dolly zoom effect by an electronic device. A first image with a corresponding first depth map and a second image with a corresponding second depth map are obtained. The first image and the second image have different fields of view. A first synthesized image and a corresponding first synthesized depth map is generated using the first image and the first depth map respectively. A second synthesized image and a corresponding second synthesized depth map are generated using the second image and the second depth map respectively. A fused image is generated from the first synthesized image and the second synthesized image. A fused depth map is generated from the first synthesized depth map and the second synthesized depth map. A final synthesized image is generated based on processing the fused image and the fused depth map.

According to one embodiment, an electronic device is provided. The electronic device includes at least one camera and a processor upon instructions being executed, the processor is caused to obtain a first image with a corresponding first depth map and a second image with a corresponding second depth map. The first image and the second image have different fields of view. The instructions also cause the processor to generate a first synthesized image and a corresponding first synthesized depth map using the first image and the first depth map respectively, and generate a second synthesized image and a corresponding second synthesized depth map using the second image and the second depth map respectively. The instructions further cause the processor to generate a fused image from the first synthesized image and the second synthesized image, generate a fused depth map from the first synthesized depth map and the second synthesized depth map, and generate a final synthesized image based on processing the fused image and the fused depth map.

According to one embodiment, a method of performing depth-aware inpainting by an electronic device. A fused image is generated from a first image and a second image. A fused depth map is generated from a first depth map and a second depth map. Depth hole-filling is performed using the fused depth map to obtain a hole-filled depth map. An occlusion mask is updated based on each of a plurality of unique depth values in the hole-filled depth map. A window averaging filter is applied for occluded areas in the fused image according to the updated occlusion mask to obtain a final image.

BRIEF DESCRIPTION OF THE DRAWINGS

The above and other aspects, features, and advantages of certain embodiments of the present disclosure will be more apparent from the following detailed description, taken in conjunction with the accompanying drawings, in which:

FIGS. 4A and 4B are diagrams illustrating single camera image synthesis under dolly zoom with forward warping, according to an embodiment of the present disclosure;

FIGS. 5A and 5B are diagrams illustrating a single camera image synthesis under dolly zoom with epipolar lines shown, according to an embodiment of the disclosure;

FIGS. 7A and 7B are diagrams illustrating image synthesis from a second camera under dolly zoom, according to an embodiment of the present disclosure;

FIGS. 8A and 8B are diagrams illustrating image synthesis from the second camera under dolly zoom with epipolar lines, according to an embodiment of the present disclosure;

FIG. 10 is a flowchart illustrating a method for nearest neighbor hole filling, according to an embodiment of the present disclosure;

DETAILED DESCRIPTION

Figure 1A:
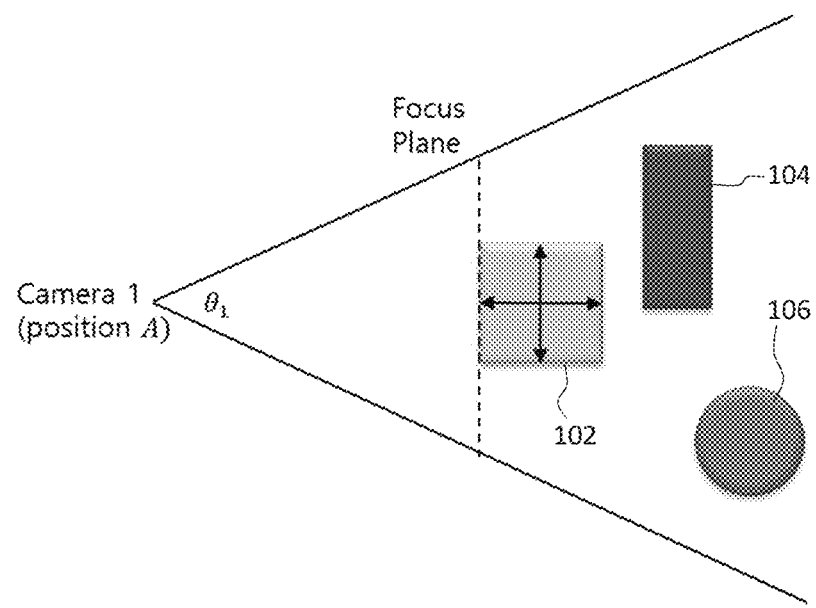
FIGS. 1A and 1B are diagrams illustrating the dolly zoom effect.
Figure 1B:
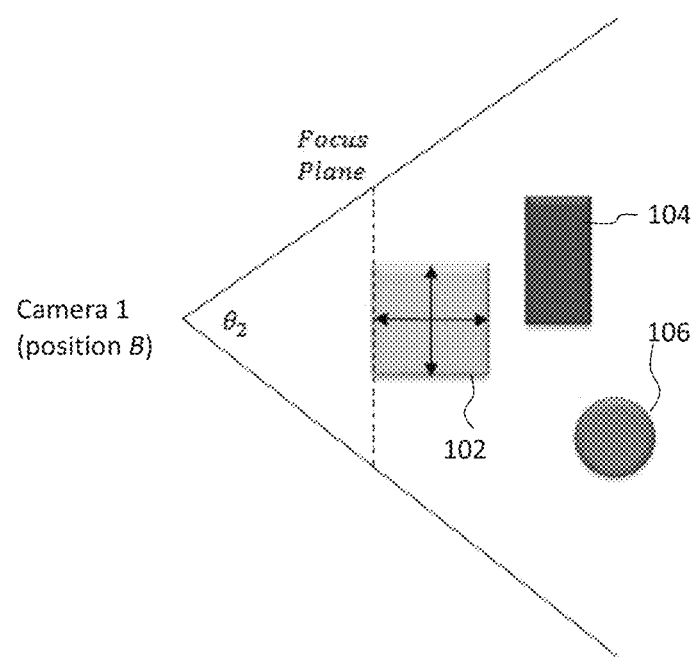

Hereinafter, embodiments of the present disclosure are described in detail with reference to the accompanying drawings. It should be noted that the same elements will be designated by the same reference numerals although they are shown in different drawings. In the following description, specific details such as detailed configurations and components are merely provided to assist with the overall understanding of the embodiments of the present disclosure. Therefore, it should be apparent to those skilled in the art that various changes and modifications of the embodiments described herein may be made without departing from the scope of the present disclosure. In addition, descriptions of well-known functions and constructions are omitted for clarity and conciseness. The terms described below are terms defined in consideration of the functions in the present disclosure, and may be different according to users, intentions of the users, or customs. Therefore, the definitions of the terms should be determined based on the contents throughout this specification.

The present disclosure may have various modifications and various embodiments, among which embodiments are described below in detail with reference to the accompanying drawings. However, it should be understood that the present disclosure is not limited to the embodiments, but includes all modifications, equivalents, and alternatives within the scope of the present disclosure.

Although the terms including an ordinal number such as first, second, etc. may be used for describing various elements, the structural elements are not restricted by the terms. The terms are only used to distinguish one element from another element. For example, without departing from the scope of the present disclosure, a first structural element may be referred to as a second structural element. Similarly, the second structural element may also be referred to as the first structural element. As used herein, the term "and/or" includes any and all combinations of one or more associated items.

The terms used herein are merely used to describe various embodiments of the present disclosure but are not intended to limit the present disclosure. Singular forms are intended to include plural forms unless the context clearly indicates otherwise. In the present disclosure, it should be understood that the terms "include" or "have" indicate the existence of a feature, a number, a step, an operation, a structural element, parts, or a combination thereof, and do not exclude the existence or probability of the addition of one or more other features, numerals, steps, operations, structural elements, parts, or combinations thereof.

Unless defined differently, all terms used herein have the same meanings as those understood by a person skilled in the art to which the present disclosure belongs. Terms such as those defined in a generally used dictionary are to be interpreted to have the same meanings as the contextual meanings in the relevant field of art, and are not to be interpreted to have ideal or excessively formal meanings unless clearly defined in the present disclosure.

The electronic device according to one embodiment may be one of various types of electronic devices. The electronic devices may include, for example, a portable communication device (e.g., a smart phone), a computer, a portable multimedia device, a portable medical device, a camera, a wearable device, or a home appliance. According to one embodiment of the disclosure, an electronic device is not limited to those described above.

The terms used in the present disclosure are not intended to limit the present disclosure but are intended to include various changes, equivalents, or replacements for a corresponding embodiment. With regard to the descriptions of the accompanying drawings, similar reference numerals may be used to refer to similar or related elements. A singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, terms such as "1$^{st}$," "2nd," "first," and "second" may be used to distinguish a corresponding component from another component, but are not intended to limit the components in other aspects (e.g., importance or order). It is intended that if an element (e.g., a first element) is referred to, with or without the term "operatively" or "communicatively", as "coupled with," "coupled to," "connected with," or "connected to" another element (e.g., a second element), it indicates that the element may be coupled with the other element directly (e.g., wired), wirelessly, or via a third element.

As used herein, the term "module" may include a unit implemented in hardware, software, or firmware, and may interchangeably be used with other terms, such as, for example, "logic," "logic block," "part," and "circuitry." A module may be a single integral component, or a minimum unit or part thereof, adapted to perform one or more functions. For example, according to one embodiment, a module may be implemented in a form of an application-specific integrated circuit (ASIC).

The present disclosure describes a system and method for modeling a dolly zoom effect based on a synthesis pipeline to simulate the effect given a single shot of single-camera or multi-camera image captures. Using a single camera single-shot image capture, the present system can simulate camera movement (along the principal axis) and camera parameter (focal length/FoV) changes based on camera geometry, image fusion, and hole filling. This process can be extended to multi-camera single-time instant shot and video sequence frames in order to simulate camera movement in horizontal and vertical directions.

Due to the nature of the camera geometry involved, simulating the effect requires at least a single camera with the depth for its FoV, but can be extended to two or more cameras. The present system and method may consider camera movement along a principal axis towards the object under focus.

The present disclosure describes a view synthesis pipeline based on camera geometry and depth for single/multi-camera image captures to generate views for camera movement in a horizontal direction (x-direction), a vertical direction (y-direction), and a translational direction (z-direction), along with a change in a FoV/focal length. In particular, the present system and method synthesizes the dolly zoom effect using the view synthesis pipeline for single and dual camera systems (the dual camera system may be extended to more cameras).

In one embodiment, the present system generates the dolly zoom effect using camera geometry and depth for one or more red-green-blue (RGB) cameras. In another embodiment, the present system may be applied to more than one camera for a multi-camera system and for camera movement in other directions (x and y along with z and FoV/focal length change). The present system and method may further be extended to video applications without deviating from the scope of the present disclosure.

In the present disclosure, the notation scheme is as follows. A matrix is denoted as H and $(.)^T$ denotes transpose. The projection of point P, defined as $P=(X, Y, Z)^T$ in $\mathbb{R}^3$, is denoted as point u defined as $u=(x, y)^T$ in $\mathbb{R}^2$. Scalars are denoted as X or x. Correspondingly, I is used to represent and image. I(x, y) or alternately I(u), is the intensity of the image at location (x, y). Similarly, for a matrix H, H(x, y) denotes the element at location (x, y) in that matrix. $J_n$ and $O_n$ denote the n×n identity matrix and n×1 zero vectors.

Given input images $I_n$ from n(n≥1) cameras with different FoVs $\theta_n$ ($\theta_n > \theta_{n-1}$) and their corresponding depths $D_n$, for each input image, project each 2D image point to the 3D coordinate using the corresponding depth value at that point, apply the required manipulation and then re-project the manipulated 3D point back to the image coordinates.

For a single view, due to occlusions and a fixed FoV, after the re-projection, there may be areas with missing information. These areas can be filled in by using an image with a larger FoV and the same image coordinate projection concept described above, followed by image fusion.

Any remaining areas with missing information due to occlusions are then handled with a hole-filling module.

After hole-filling, a shallow depth of field (SDoF) effect is applied to obtain the final synthesized image.

Each step in the above process is described in greater detail below. A case is considered for two cameras (i.e., n=2), but the derivation can easily be extended to more cameras, or can be applied to a single camera with some pre-processing.

Image synthesis may be described as pixel movement with image warping. Pixel movement may be derived for different methods for different objectives. For example, optical flow is used to find pixel movement between consecutive images. The present disclosure may derive pixel movement if the camera moves in the x and y directions along with z, and a change in the FoV or focal length.

Single Camera Setup

Let $I_1$ be the input image from camera 1, and $D_1$ be the corresponding depth map, so that at each pixel location $u=(x, y)^T$, the corresponding depth $D_1(u)$ may be obtained.

Figure 2:
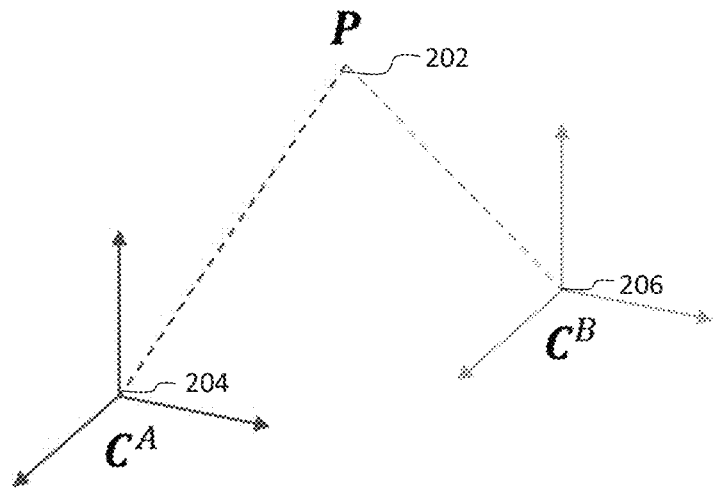
FIG. 2 is a diagram illustrating camera translation, according to an embodiment of the disclosure.

FIG. 2 is a diagram illustrating camera translation, according to an embodiment of the disclosure. Assuming a pin-hole camera model, the general formula for the relationship between the projection of any point P202, where $P \in \mathbb{R}^3$, onto the image planes of a camera as it moves from location $C^A$ 204 to $C^B$ 206, as show in FIG. 2 is given as in Equation (1) below.

$$\begin{pmatrix} u^B \\ 1 \end{pmatrix} = \frac{D^A}{D^B} K^B R (K^A)^{-1} \begin{pmatrix} u^A \\ 1 \end{pmatrix} + \frac{K^B T}{D^B} \qquad (1)$$

Herein, the 2×1 vector $u^X$, the 3×3 matrix $K^X$ and the scalar $D^X$ are the pixel coordinates on the image plane, the intrinsic parameters and the depths of the point P for the camera at positions X, $X \in \{A, B\}$. The 3×3 matrix R and the 3×1 vector T are the relative rotation and translation of the camera at position B with respect to position A. T can also be written as $T=R(C^A-C^B)$.

The camera intrinsic matrix $K_1^A$ of camera 1 at location $C_A$ 204 can be given by as Equation (2) below.

$$K_1^A = \begin{bmatrix} 1 & 0 & u_0 \\ 0 & 1 & v_0 \\ 0 & 0 & 1 \end{bmatrix} \begin{bmatrix} f_1^A & 0 & 0 \\ 0 & f_1^A & 0 \\ 0 & 0 & 1 \end{bmatrix} \begin{bmatrix} 1 & \frac{s}{f_1^A} & 0 \\ 0 & 1 & 0 \\ 0 & 0 & 1 \end{bmatrix} \qquad (2)$$

Here, $$u_0 = \frac{W}{2}$$

where W is the image width, $$v_0 = \frac{H}{2}$$

where H is the image height, $f_1^A$ is the focal length of camera 1 at location $C_A$ 204, and s is the shear factor which is assumed to be 0. The principal point is defined as $u_0=(u_0, v_0)^T$. The camera intrinsic matrix can therefore be given by Equation (3) below.

$$K_1^A = \begin{bmatrix} 1 & 0 & u_0 \\ 0 & 1 & v_0 \\ 0 & 0 & 1 \end{bmatrix} \begin{bmatrix} f_1^A & 0 & 0 \\ 0 & f_1^A & 0 \\ 0 & 0 & 1 \end{bmatrix} \qquad (3)$$

Figure 3:
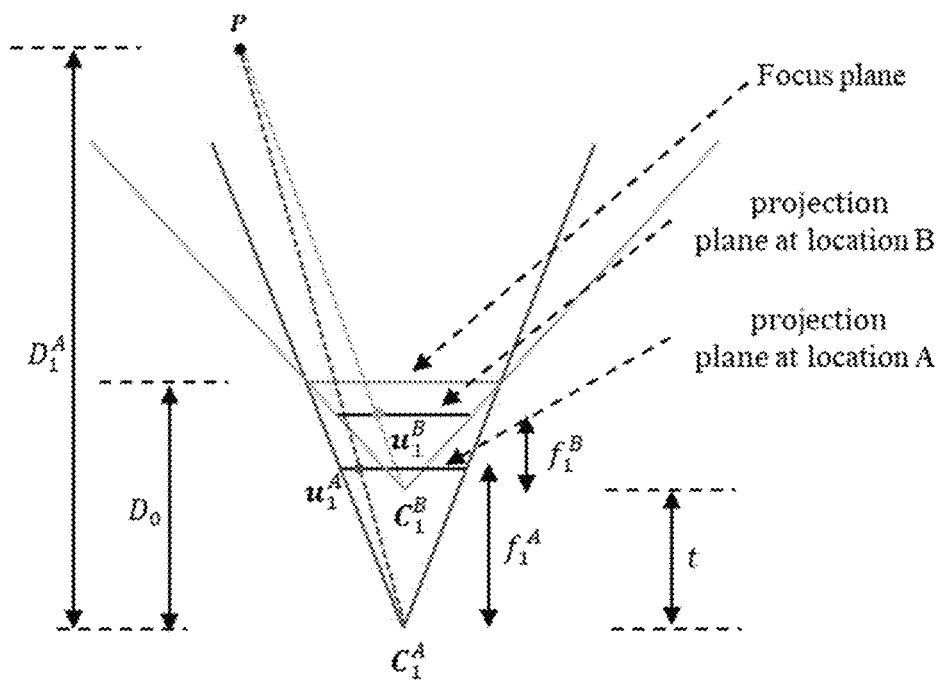
FIG. 3 is a diagram illustrating camera geometry under dolly zoom, according to an embodiment of the present disclosure.

FIG. 3 is a diagram illustrating camera geometry under dolly zoom, according to an embodiment of the present disclosure. Camera 1, at an initial position $C_1^A$ with a FoV $\theta_1^A$ and focal length $f_1^A$, undergoes translation by a distance t to a position $C_1^B$ along with a change in its focal length to $f_1^B$ and correspondingly, a change in FoV to $\theta_1^B$ ($\theta_1^B \geq \theta_1^A$).

The following assumptions are made for dolly zoom for a single camera. The translation of the camera center is on the principle axis, as in Equation (4) below. Additionally, There is no relative rotation with camera translation. Therefore, R is an identity matrix $J_3$.

$$C_1^A - C_1^B = (0,0,-t)^T D_1^B = D_1^A - t \qquad (4)$$

where t is the translation in the camera center along the principle axis, and $D_1^A$ and $D_1^B$ are the depths of the point P at locations $C_1^A$ and $C_1^B$, respectively.

The intrinsic matrix $K_1^B$ at position $C_1^B$ is related to that at $C_1^A$ through a zooming factor k, and can be given by Equation (5) below.

$$K_1^B = K_1^A \begin{bmatrix} k & 0 & 0 \\ 0 & k & 0 \\ 0 & 0 & 1 \end{bmatrix} \qquad (5)$$

Here k can be given as $$k = \frac{D_0 - t}{D_0},$$

where $D_0$ is the dolly zoom depth (i.e. the depth of the point/plane under focus). Equations (3), (4), and (5) are substituted into (1) to get Equation (6) below.

$$\begin{pmatrix} u_1^B \\ 1 \end{pmatrix} = \frac{D_1^A}{D_1^A - t} K_1^B (K_1^A)^{-1} \begin{pmatrix} u_1^A \\ 1 \end{pmatrix} + \frac{K_1^B (0, 0, -t)^T}{D_1^A - t} \qquad (6)$$

When Equation (6) is solved, the expression for $u_1^b$ is obtained in Equation (7) below.

$$u_1^B = \frac{D_1^A(D_0 - t)}{D_0(D_1^A - t)} u_1^A + \frac{t(D_1^A - D_0)}{D_0(D_1^A - t)} u_0 \qquad (7)$$

Using Equation (7), $I_1$ can be warped using $D_1$ for a camera translation step t (so that for each pixel u=(x, y), the corresponding depth $D_1(u)$ may be obtained) to obtain the synthesized image $I_1^{DZ}$. Equation (7) derives pixel movement if the camera moves in the z direction by determining movement of coordinates under a desired dolly zoom depth. Similarly, $D_1$ can be warped, and with the known t, the corresponding depth $D_1^{DZ}$ can be obtained. Herein, forward warping with z-buffering is used for this purpose.

FIGS. 4A and 4B are diagrams illustrating single camera image synthesis under dolly zoom with forward warping, according to an embodiment of the present disclosure. FIG. 4A illustrates an input image $I_1$ with $\theta_1^A=45°$, and FIG. 4B illustrates a synthesized image $I_1^{DZ}$ with $\theta_1^B=50°$ after dolly zoom step t.

In epipolar geometry, pixel movement is along epipolar lines, which is related by a fundamental matrix of two camera views. The fundamental matrix $F_1$ relates corresponding pixels on two image pixel domains without knowledge of pixel depth information. Therefore, this is a necessary condition for points to correspond, as shown in Equation (8) below.

$$x_1^{BT} F_1 x_1^A = 0 \text{ where} \qquad (8)$$

$$x_1^A = \begin{pmatrix} u_1^A \\ 1 \end{pmatrix} x_1^B = \begin{pmatrix} u_1^B \\ 1 \end{pmatrix}.$$

Since a new camera position $C_1^B$ is artificially created, fundamental matrix $F_1$ can be obtained in closed form. With a cross product in matrix form $[\ ]_x$, Equation (9) is provided below.

$$F_1 = K_1^{B-T} K_1^{A^T} [K_1^A C]_x = \begin{bmatrix} \frac{1}{f_1} & 0 & 0 \\ 0 & \frac{1}{f_1} & 0 \\ -\frac{u_0}{f_1} & -\frac{v_0}{f_1} & 1 \end{bmatrix} \begin{bmatrix} \frac{1}{k} & 0 & 0 \\ 0 & \frac{1}{k} & 0 \\ 0 & 0 & 1 \end{bmatrix} \begin{bmatrix} f_1 & 0 & 0 \\ 0 & f_1 & 0 \\ u_0 & v_0 & 1 \end{bmatrix} \qquad (9)$$

$$t \begin{bmatrix} 0 & -1 & v_0 \\ 1 & 0 & -u_0 \\ -v_0 & u_0 & 0 \end{bmatrix} = \frac{t}{k} \begin{bmatrix} 0 & -1 & v_0 \\ 1 & 0 & -u_0 \\ -v_0 & u_0 & 0 \end{bmatrix}$$

The epipolar lines on the pixel domain of camera at $C_1^B$ can be obtained, as shown in Equation (10) below.

$$l_1^B = F_1 x_1^A \qquad (10)$$

All of the epipolar lines converge to the epipole $e_1^B$, which is the null space of $F_1^T$, as shown in Equation (11) below.

$$F_1^T e_1^B = 0 \qquad (11)$$

FIGS. 5A and 5B are diagrams illustrating a single camera image synthesis under dolly zoom with epipolar lines shown, according to an embodiment of the disclosure. The epipole $e_1^B = [u_0, v_0, 1]$ is shown on the camera at $C_1^B$. FIG. 5A illustrates an input image $I_1$ 502 with of $\theta_1^A=45°$, and FIG. 5B illustrates a synthesized image $I_1^{DZ}$ 504 with $\theta_1^B=50°$ after dolly zoom step t.

As shown in FIGS. 5A and 5B, occlusion occurs along with the epipolar line. As long as there are discontinuity along epipolar lines, pixel movement will be different and results in holes. With fundamental matrix $F_1$ derived in closed form, epipolar line information can be utilized for hole filing and occlusion handling, as described in greater detail below.

Camera movement may be given as Equation (12) below. Herein, $m_1$, $n_1$ and $t_1$ denotes the camera movement in the horizontal, vertical and along the principal axis directions, respectively.

$$C_1^A - C_1^B = (-m_1, -n_1, -t)^T \quad (12)$$

Equation (6) may then be re-written as Equation (13) below.

$$\begin{pmatrix} u_1^B \\ 1 \end{pmatrix} = \frac{D_1^A}{D_1^A - t} K_1^B (K_1^A)^{-1} \begin{pmatrix} u_1^A \\ 1 \end{pmatrix} + \frac{K_1^B (-m_1, -n_1, -t_1)^T}{D_1^A - t} \quad (13)$$

Solving Equation (13), an equation for $u_1^B$ can be obtained, as set forth in Equation (14) below.

$$u_1^B = \frac{D_1^A(D_0 - t_1)}{D_0(D_1^A - t_1)} u_1^A + \frac{t_1(D_1^A - D_0)}{D_0(D_1^A - t_1)} u_0 - \frac{(D_0 - t_1)f_1^A}{D_0(D_1^A - t_1)} \begin{pmatrix} m_1 \\ n_1 \end{pmatrix} \quad (14)$$

Equation (14) may be used to obtain a synthesized image for camera movement in the x, y, and z directions along with a change of FoV.

The FoV $\theta_1^A$ at position $C_1^A$ may be a partial FoV of the actual camera FoV $\theta_1$ at an initial position $C_1$. Let the actual intrinsic matrix at position $C_1$ be $K_1$. Then the intrinsic matrix $K_1^A$ for the partial FoV can be obtained as set forth in Equation (15) below.

$$K_1^A = K_1 \begin{bmatrix} k_0 & 0 & 0 \\ 0 & k_0 & 0 \\ 0 & 0 & 1 \end{bmatrix} \text{ where} \quad (15)$$

$$k_0 = \frac{f_1^A}{f_1} = \frac{\tan\left(\frac{\theta_1}{2}\right)}{\tan\left(\frac{\theta_1^A}{2}\right)}$$

A closed form equation may be obtained for the zoom pixel coordinates $u_1^A$ in terms of $u_1$ of the actual image locations (with camera rotation as an identity matrix $J_3$) as set forth below in Equation (16).

$$u_1^A = \frac{f_1^A}{f_1} u_1 + \left(1 - \frac{f_1^A}{f_1}\right) u_0 \quad (16)$$

The above equation may be used to digitally zoom the input image $I_1$ and its depth map $D_1$ to the required FoV $\theta_1^A$ to obtain the zoomed-in image and depth map.

Dual Camera Setup

Applying the synthesis formula from Equation (7) for a single camera, results in many missing and occlusion areas as the FoV increases or decreases. Some of these areas can be filled using projections from other available cameras with a different FoV. A second camera can be introduced to the system. $I_2$ is set as the input image from camera 2 and $D_2$ is set as the corresponding depth map, so that each pixel location u and the corresponding depth $D_2$ (u) may be obtained. The FoV of camera 2 is greater than that of camera 1 (i.e. $\theta_2 > \theta_1$).

Figure 6:
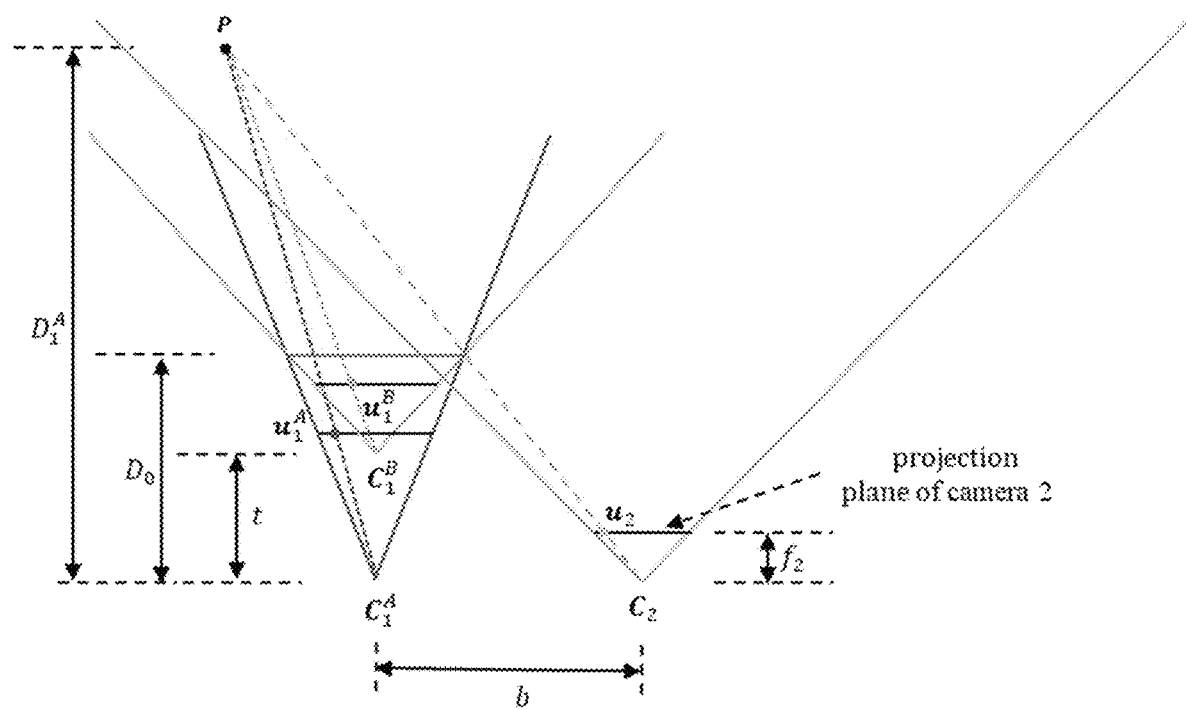
FIG. 6 is a diagram illustrating a two-camera system, according to an embodiment of the disclosure.

FIG. 6 is a diagram illustrating a two-camera system, according to an embodiment of the disclosure. The second camera is at $C_2$ with a focal length $f_2$. It is assumed that the two cameras are well calibrated so that they are on the same plane and their principle axes are perpendicular to that plane. The baseline between the two cameras is b.

The relationship between the projection of a point P on the projection plane of camera 2 ($u_2$) and its projection after dolly zoom is applied to camera 1 (i.e., the translation of camera 1 to position $C_1^B$ which is $u_1^B$) can be obtained from Equation (1) and can be written as Equation (17) below.

$$\begin{pmatrix} u_1^B \\ 1 \end{pmatrix} = \frac{D_2}{D_1^B} K_1^B R(K_2)^{-1} \begin{pmatrix} u_2 \\ 1 \end{pmatrix} + \frac{K_1^B T}{D_1^B} \quad (17)$$

The translation of the camera center from position $C_2$ to position $C_1^B$ can be given as in Equation (18) below.

$$C_2 - C_1^B = (b, 0, -t)^T \quad (18)$$

where b is the baseline between the two cameras.

It is assumed that there is no relative rotation (corrected by camera calibration) between the two cameras, and therefore, R is an identity matrix. Cameras 1 and 2 have the same depth due to the assumption that the camera centers are on the sample and the principal axis being perpendicular to that plane. Therefore, the depth $D_1^B$ of the point P for camera 1 at position $C_1^B$ in terms of the depth $D_2$ for camera 2 at position $C_2$ can be given as in Equation (19) below.

$$D_2 = D_1^A D_1^b = D_2 - t \quad (19)$$

The intrinsic matrix $K_2$ for camera 2 is related to the intrinsic matrix of camera 1 at position $C_1^A$, as shown in Equation (20) below.

$$K_2 = K_1^A \begin{bmatrix} k' & 0 & 0 \\ 0 & k' & 0 \\ 0 & 0 & 1 \end{bmatrix} \quad (20)$$

Here, k' can be given as in Equation (21) below.

$$k' = \frac{f_2}{f_1^A} = \frac{\tan\left(\frac{\theta_1^A}{2}\right)}{\tan\left(\frac{\theta_2}{2}\right)} \quad (21)$$

where $f_1^A$ and $f_2$ are the focal lengths and $\theta_1^A$ and $\theta_2$ are the FOVs of camera 1 (at position $C_1^A$) and camera 2, respectively.

When Equations (18), (19), (20), and (21) are substituted into Equation (17), Equation (22) is derived, as set forth below.

$$\begin{pmatrix} u_1^B \\ 1 \end{pmatrix} = \frac{D_2}{D_1^B} K_1^B R(K_2)^{-1} \begin{pmatrix} u_2 \\ 1 \end{pmatrix} + \frac{K_1^B (b, 0, -t)^T}{D_1^B} \quad (22)$$

When Equation (22) is solved, the expression for $u_1^B$ is obtained, as shown in Equation (23) below.

$$u_1^B = \frac{D_2 k}{(D_2-t)k'}(u_2-u_0)+u_0+\begin{pmatrix} \frac{bf_1^A k}{D_2-t} \\ 0 \end{pmatrix} \quad (23)$$

Using Equation (23), $I_2$ can be warped using $D_2$ for a camera translation step t (so that for each pixel u=(x, y), the corresponding depth $D_2$ (u) may be obtained) to obtain the synthesized image $I_2^{DZ}$. $D_2$ can also be warped and with the known t, the corresponding depth $D_2^{DZ}$ can be obtained. Forward warping with z-buffering is used for this step.

FIGS. 7A and 7B are diagrams illustrating image synthesis from a second camera under dolly zoom, according to an embodiment of the present disclosure. Specifically, FIG. 7A illustrates an input image $I_2$ with $\theta_2=77°$, and FIG. 7B illustrates a synthesized image $I_2^{DZ}$ after dolly zoom step t.

Similar to the case for a single camera, the fundamental matrix $F_2$ can be derived in closed form, as shown in Equation (24) below.

$$x_1^{B'} F_2 x_2 = 0 \text{ where} \quad (24)$$
$$x_2 = \begin{pmatrix} u_2 \\ 1 \end{pmatrix}, x_1^B = \begin{pmatrix} u_1^B \\ 1 \end{pmatrix}.$$

The fundamental matrix $F_2$ can be obtained by $F_2=[e_1^B]\times P_1^B P_2^+$, where the epipole $$e_1^B = P_1^B[0, 0, 0, 1]^T = \left[u_0-\frac{bfk}{t}, v_0, 1\right]^T,$$

the projection matrix $$P_1^B = K_1^B \begin{bmatrix} & & -b \\ J_3 & 0 & \\ & & t \end{bmatrix},$$

denotes pseudo-inverse of $P_2$ and $$P_2 = K_2 \begin{bmatrix} & & 0 \\ J_3 & 0 & \\ & & 0 \end{bmatrix},$$

as shown in Equation (25) below.

$$F_2 = [e_1^B]\times P_1^B P_2^+ = \frac{kt}{k'}\begin{bmatrix} 0 & -1 & v_0 \\ 1 & 0 & \frac{bf_1 k'}{t}-u_0 \\ -v_0 & u_0-\frac{bf_1 k}{t} & \frac{bf_1 v_0(k-k')}{t} \end{bmatrix} \quad (25)$$

FIGS. 8A and 8B are diagrams illustrating image synthesis from the second camera under dolly zoom with epipolar lines, according to an embodiment of the present disclosure. Specifically, FIG. 8A illustrates the input image $I_2$ 802 with $\theta_2=77°$, and FIG. 8B illustrates a synthesized image $I_2^{DZ}$804 after dolly zoom step t. The actual epipole $e_2$ for the wide image is (875.11, 540), and epipole $e_1^B$ for the position B image is (815.18, 540).

The closed-form fundamental matrix $F_2$ can again be used in occlusion handling to find corresponding epipolar lines.

The derivation can easily be extended to include any number of additional cameras in the system.

Equation (17) may be generalized for camera movement in the x and y directions.

Camera movement may be given by Equation (26) below. The baseline b is assumed to be included in $m_2$ and/or $n_2$.

$$C_2 - C_1^B = (-m_2, -n_2, -t_2)^T \quad (26)$$

Equation (22) may then be re-written as Equation (27) below.

$$\begin{pmatrix} u_1^B \\ 1 \end{pmatrix} = \frac{D_2}{D_1^B} K_1^B R(K_2)^{-1}\begin{pmatrix} u_2 \\ 1 \end{pmatrix} + \frac{K_1^B(-m_2, -n_2, -t_2)^T}{D_2 - t} \quad (27)$$

Solving Equation (27), the expression for $u_1^B$ is obtained, as shown in Equation (28) below.

$$u_1^B = \frac{D_2 k}{(D_2-t_2)k'}(u_2-u_0)+u_0+\frac{f_1^A k}{(D_2-t_2)}\begin{pmatrix} m_2 \\ n_2 \end{pmatrix} \quad (28)$$

Equation (28) may be used to obtain a synthesized image for camera movement in the x, y, and z directions along with a change of FoV.

Image Fusion

The synthesized image $I_2^{DZ}$ from the second camera may be used to fill in missing/occlusion areas in the synthesized image $I_1^{Dz}$ from the first camera. This is achieved through image fusion.

As a first step, missing areas in the synthesized image $I_1^{DZ}$ are identified. Herein, a simple scheme is implemented, as set forth below, to create a binary mask B by checking the value of $I_1^{DZ}$ at each pixel location (x, y), using Equation (29) below. Herein, $O_1^{m,c}$ denotes a set of missing/occluded pixels for $I_1^{DZ}$.

$$B(x, y) = \begin{cases} 1, & I_1^{DZ}(x, y) \in O_1^{m,c} \\ 0, & I_1^{DZ}(x, y) \notin O_1^{m,c} \end{cases} \quad (29)$$

Equations (19) and (23) can also be used to identify these areas.

As a second step, with the binary mask B, the synthesized images $I_1^{DZ}$ and $I_2^{DZ}$ are fused to generate $I_F$, as shown in Equation (30) below.

$$I_F = B \cdot I_2^{DZ} + (1-B) \cdot I_1^{DZ} \quad (30)$$

The depths $D_1^{DZ}$, $D_2^{DZ}$ for the synthesized images are also fused in a similar manner to obtain $D_F$.

Figure 9A:
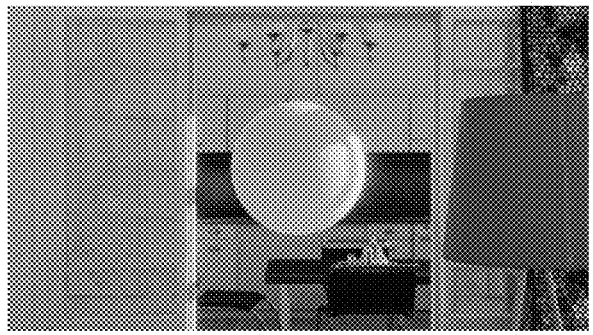
FIGS. 9A-9F are diagrams illustrating image fusion, according to an embodiment of the present disclosure.
Figure 9B:
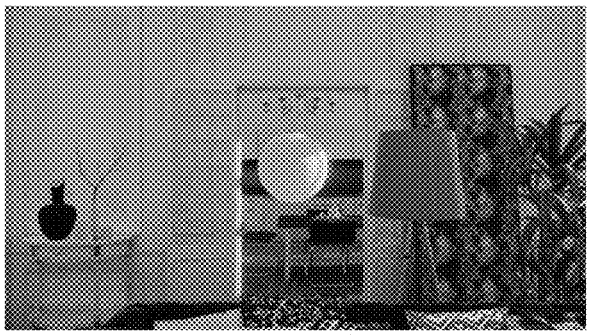
Figure 9C:
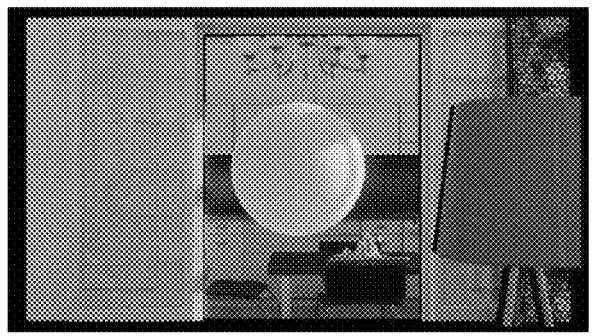
Figure 9D:
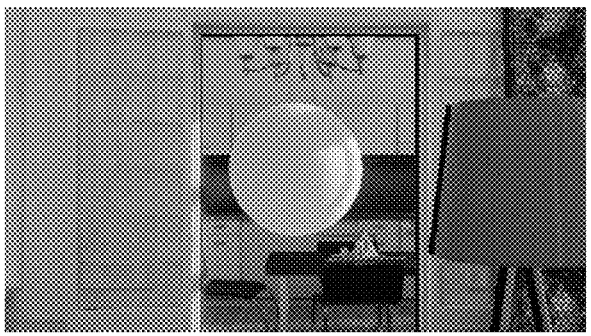
Figure 9E:
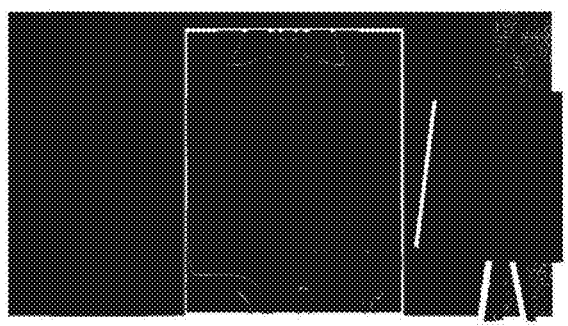
Figure 9F:
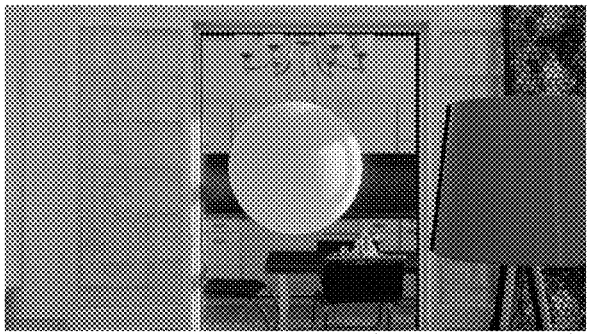

FIGS. 9A-9F are diagrams illustrating image fusion, according to an embodiment of the present disclosure. FIG. 9A illustrates the input image $I_1$, with $\theta_z^A=45°$, and FIG. 9B illustrates the input image $I_2$ with $\theta_2=77°$. FIG. 9C illustrates the synthesized image $I_1^{DZ}$ with $\theta_1^B=50°$ after dolly zoom step t, and FIG. 9D illustrates the synthesized image $I_2^{DZ}$ after dolly zoom step t. FIG. 9E illustrates the binary mask B, and FIG. 9F illustrates the synthesized fused image $I_F$ after dolly zoom step t.

Occlusion Handling

For each synthesized dolly zoom image, areas with missing information (typically due to occlusion) are identified and filled in for satisfactory subjective viewing. Occlusions occur due to the nature of the camera movement, from the foreground to the background. Therefore, one constraint on filling occlusion areas is that they should be filled only with the background and not the foreground.

As a first step, occlusion areas are identified. $I_F$ is the generated image after image fusion. M is a binary mask depicting occlusion areas. M is simply generated by checking the value of $I_F$ at each pixel location (x, y), as shown in Equation (31) below. Herein, $O_F^c$ denotes a set of occluded pixels for $I_F$.

$$M(x, y) = \begin{cases} 1, & I_F(x, y) \in O_F^c \\ 0, & I_F(x, y) \notin O_F^c \end{cases} \quad (31)$$

Equations (19) and (23) can instead be used to identify these area

A critical piece of information is the fused depth $D_F$ for the synthesized image, which distinguishes between foreground and background. $D_F$ will also have holes due to occlusion. If the depth is used for image inpainting, the holes in the depth itself must first be filled.

Depth Hole Filling

Referring now to FIG. 10, a flowchart illustrates a method for nearest neighbor hole filling, according to an embodiment of the present disclosure. The filled-in depth map is $\overline{D_F}$, and is initialized as $\overline{D_F}=D_F$. At 1002, for each pixel location (x, y) with M(x, y)=1, the present system determines four nearest neighbors (top, bottom, left, right) with valid depth values. In the current implementation, pixels are filled in a raster scan order (i.e., row-wise, left to right). At 1004, the present system determines a neighbor with the maximum depth value ($d_{max}$). At 1006, the present system sets the filled-in depth map at a given pixel location equal to the maximum depth value, $\overline{D_F}(x, y)=d_{max}$. At 1008, the present system determines whether there are other pixel locations. If there are other pixel locations, the present system returns to 1002 to repeat the methodology for a next pixel. If there are no other pixel locations, the present system terminates the methodology, at 1010. the filled-in depth $D_F$ is determined.

Synthesized View Hole Filling

The present system may perform hole filling for a synthesized image, also referred to as depth-aware inpainting, based on propagating from the image background towards the image foreground. The present system may perform hole filling in a back-to-front order based on filling in holes in the image from parts of the image at the same depth or the next closest depth.

The inputs are the synthesized image $I_F$, hole filled synthesized depth map $\overline{D_F}$, and an original occlusion mask M. The output is set to the synthesized image $\overline{I_F}$ where $\overline{I_F}=I_F$. All the unique values in $\overline{D_F}$ are determined. $d^u$ is set as the array of unique depth values, where $d^u$ is in a descending order of depth values S. For example, $d^u$ is an array representing [5, 4, 3, 2, 1], where a depth value S of 5 is farthest and a depth value S of 1 is nearest. The present system starts by selecting a depth segment corresponding to the farthest depth value S.

Figure 11:
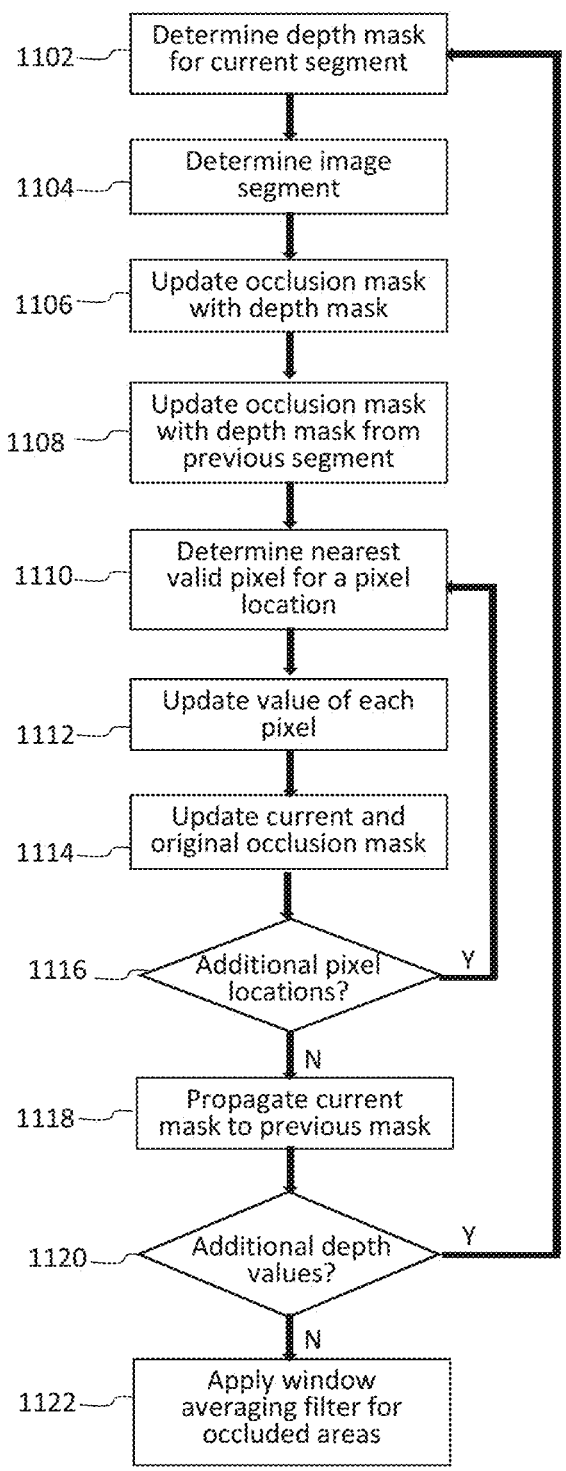
FIG. 11 is a flowchart illustrating a method for depth-aware inpainting, according to an embodiment of the present disclosure.

Referring now to FIG. 11, a flowchart illustrates a method for depth-aware inpainting, according to an embodiment of the present disclosure. At 1102, the present system determines a depth mask $D_n$ for a current depth segment between a current depth value S and a subsequent depth value (S−1). The present system may determine the depth mask $D_n$ based on Equation (32) below. Here, ≥ is the element-wise matrix greater than or equal to operation while & is the element-wise matrix AND operation.

$$D_n = (\overline{D_F} \geq d^u(s-1)) \& (\overline{D_F} \leq d^u(s)) \quad (32)$$

At 1104, the present system determines an image segment corresponding to the depth mask $I_s$. The present system may determine the image segment based on Equation (33) below. Here, · is the element-wise matrix product.

$$I_s = I_F \cdot D_n \quad (33)$$

At 1106, the present system updates an occlusion mask with the depth mask to obtain a current occlusion mask $M_{curr}$ for the current depth segment. The present system may obtain the current occlusion mask $M_{curr}$ based on Equation (34).

$$M_{curr} = M \cdot D_n \quad (34)$$

At 1108, the present system updates the current occlusion mask based on a previous mask from a previous depth segment. For the first depth segment, the present system may initialize $M_{Prev}$ with zeros. The present system may update the current occlusion mask based on Equation (35) below. Here, | | is the element-wise matrix OR operation.

$$M_{curr} = M_{curr} | M_{Prev} \quad (35)$$

At 1110, if $M_{curr}(x, y)=1$, for each pixel location, the present system determines a nearest valid pixel on the same line $I_s(x, y')$, where (x, y') is the location of the valid pixel. The present system may further determine more than one valid pixel in both the horizontal and vertical directions. At 1112, the present system updates a value of each pixel in the synthesized view $\overline{I_F}(x, y)$ based on the nearest valid pixel on the same line $I_s(x, y')$ using $\overline{I_F}(x, y)=I_s(x, y')$. At 1114, the present system updates the current occlusion mask $M_{curr}(x, y)=0$, and the original occlusion mask M(x, y)=0.

At 1116, the present system determines whether there are additional pixel locations. When there are additional pixel locations, the present system returns to 1110 to determine a nearest valid pixel for the next pixel location. When there are no additional pixel locations, the present system propagates the current occlusion mask $M_{curr}$ to be the previous occlusion mask $M_{Prev}$, at 1118. At 1120, the present system determines whether there are subsequent depth values in $d^u$. When there are subsequent depth values, the present system returns to 1102 to repeat the methodology for a next depth value.

When there are no subsequent depth values, the present system applies a window averaging (e.g., kernel size is set to 10×10) filter for occluded areas in $\overline{I_F}$ according to M, at 1122.

Figure 12A:
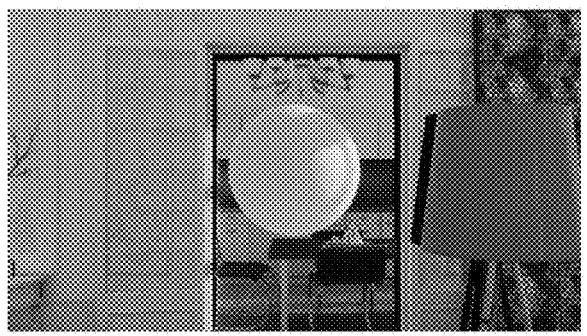
FIGS. 12A-12D are diagrams illustrating a hole filling process for a certain step s, according to an embodiment of the present disclosure.
Figure 12B:
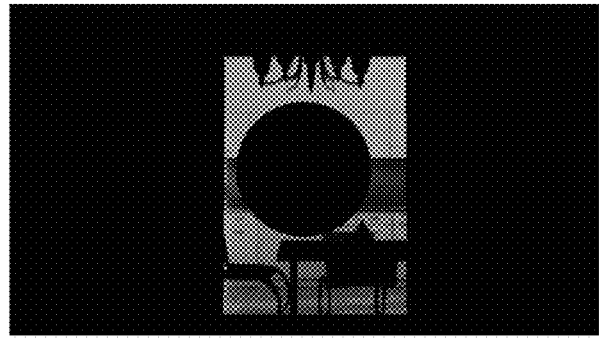
Figure 12C:
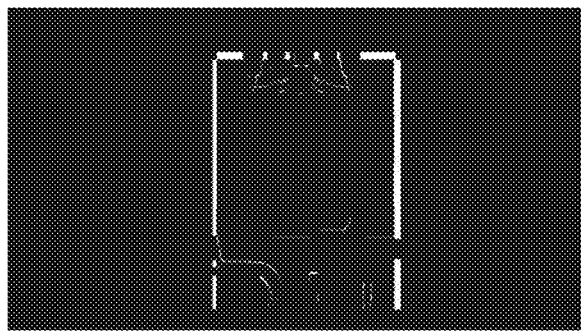
Figure 12D:
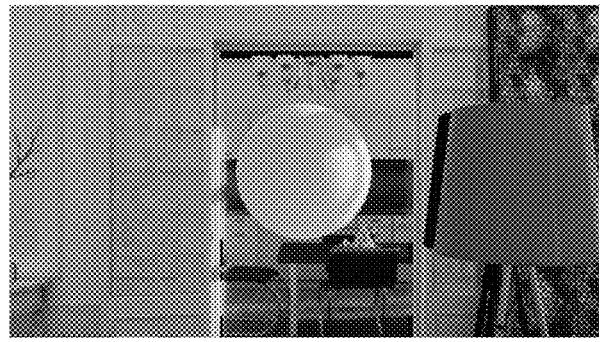

FIGS. 12A-12D are diagrams illustrating a hole filling process for a certain step s, according to an embodiment of the present disclosure. FIG. 12A illustrates the synthesized image $I_F$, and FIG. 12B illustrates the depth based image segment $I_s$ at s. FIG. 12C illustrates the occlusion mask $M_{curr}$ at a depth value s, and FIG. 12D illustrates the filled-in image $\overline{I_F}$ after the depth value s.

Figure 13A:
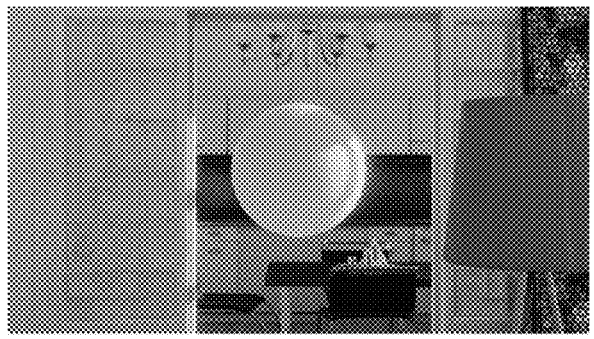
FIGS. 13A-13G are diagrams illustrating the results of a hole filling process, according to an embodiment of the present disclosure.
Figure 13B:
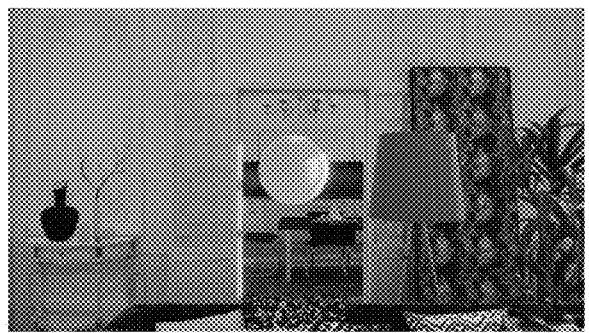
Figure 13C:
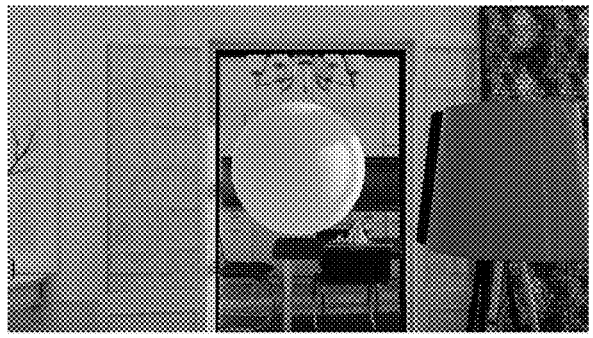
Figure 13D:
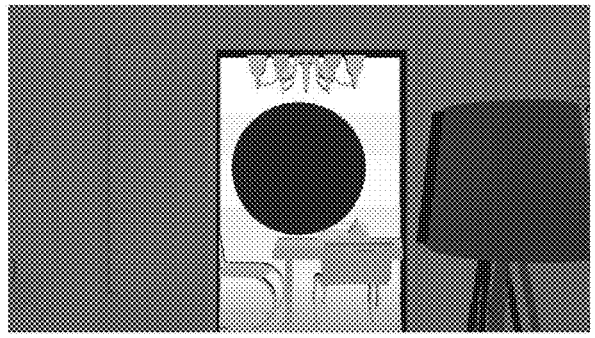
Figure 13E:
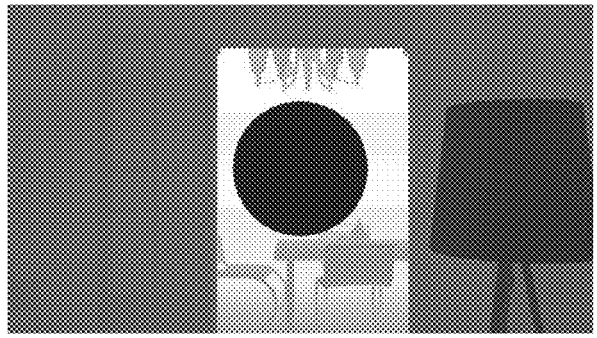
Figure 13F:
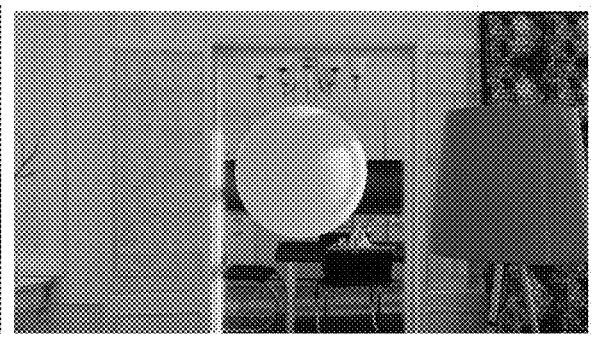
Figure 13G:
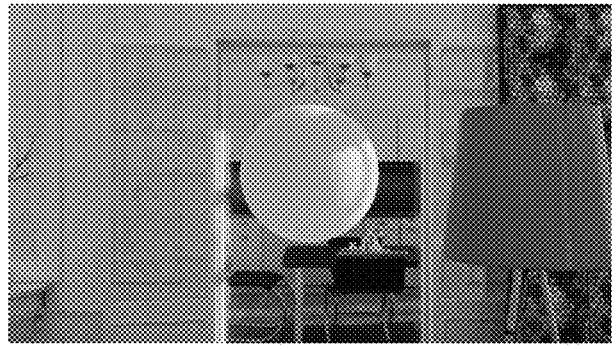

FIGS. 13A-13G are diagrams illustrating the results of a hole filling process, according to an embodiment of the present disclosure. FIG. 13A illustrates the input image $I_1$ with $\theta_1^A=45°$, and FIG. 13B illustrates the input image $I_2$ with $\theta_2=77°$. FIG. 13C illustrates the synthesized fused image $I_F$ after dolly zoom step t. FIG. 13D illustrates the depth map $D_F$ for the fused image $I_F$, and FIG. 13E illustrates the depth map after hole filling $\overline{D_F}$. FIG. 13F illustrates the synthesized image $\overline{I_F}$ after hole filling using OpenCV (PSNR=16.0680), and FIG. 13G illustrates the synthesized image $\bar{I}_F$ after hole filling according to the present disclosure (PSNR=20.0612).

SDoF

After image synthesis and occlusion handling, the present system may further apply the SDoF effect. The purpose of a bokeh algorithm is to implement the SDoF effect by varying the blur strength according to the depth. Thus, for the bokeh effect, it is necessary to determine the blur kernel size for each area based on depth. The diameter of blur kernel, as set forth below, means the circle of confusion (CoC) in depth of field related literature. Unlike synthetic SDoF effects for image capture, the blur strength varies not only according to the depth but also the dolly zoom translation parameter t for the dolly zoom effect.

Figure 14:
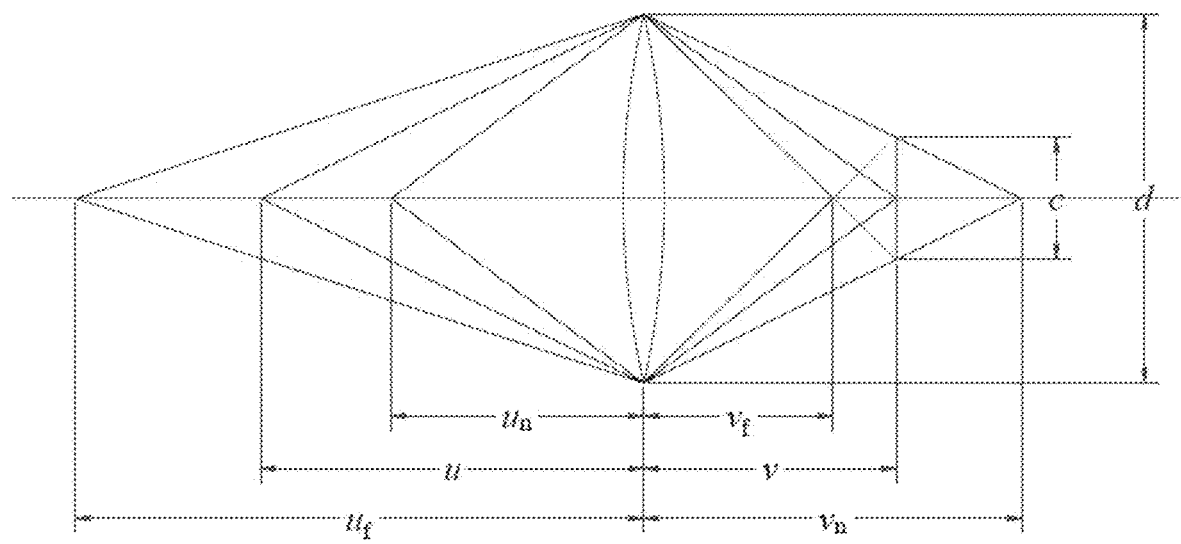
FIG. 14 is a diagram illustrating a thin lens camera model and circle of confusion, according to an embodiment of the present disclosure.

FIG. 14 is a diagram illustrating a thin lens camera model and circle of confusion, according to an embodiment of the present disclosure.

As shown in FIG. 14: $v$, $v_f$, $v_n$ are image distances of objects located at $P_0$, $P_f$, $P_n$, respectively; f is the focal length of a lens; $D_0$, $D_f$, $D_n$ are depths at $P_0$, $P_f$, $P_n$, respectively; d is an effective lens size; and c is the circle of confusion on the image plane.

A lens equation is set forth in Equation (36) below.

$$\frac{1}{v} + \frac{1}{D} = \frac{1}{f} \tag{36}$$

The relation between c, lens aperture A, magnification factor m, depth to an object under focus $D_0$ and another object at depth D can be given as Equation (37) below.

$$c = Am\frac{|D - D_0|}{D} \tag{37}$$

Where the magnification factor m is set forth in Equation (38) below.

$$m = \frac{v}{u} = \frac{f}{u - f} \tag{38}$$

The above equations are satisfied when there is no zooming applied for the camera, i.e. the focal length of the thin lens f is fixed. Under the dolly zoom condition, the focal length changes according to the movement t along the principle axis. Here, we denote the focal length with respect to step t as f (t).

Therefore, the relationship between f (t) and t is shown in Equation (39) below.

$$f(t) = \frac{D_0 - t}{D_0} f(0) \tag{39}$$

Accordingly, the magnification factor m(t) with respect to t can be obtained as Equation (40) below.

$$m(t) = \frac{f(0)}{D_0 - f(0)} = m(0) = m \tag{40}$$

The above equation perfectly aligns with pinhole camera model under dolly zoom, i.e., the magnification factor for subjects in focus is fixed. Also, the relative depth $|D-D_0|$ between subjects within the scene remains constant for single image capture. Assuming the lens aperture A remains the same, the circle of confusion can be obtained using Equation (41) below.

$$c(t) = Am\frac{|D - D_0|}{D} = c(0)\frac{D}{D - t} \tag{41}$$

where c(t) is the circle of confusion diameter for an subject at depth D and the camera translation t along the principle axis.

As long as the CoC for all the pixels within the image is found, any conventional method may be used for synthetic SDoF generation.

Figure 15:
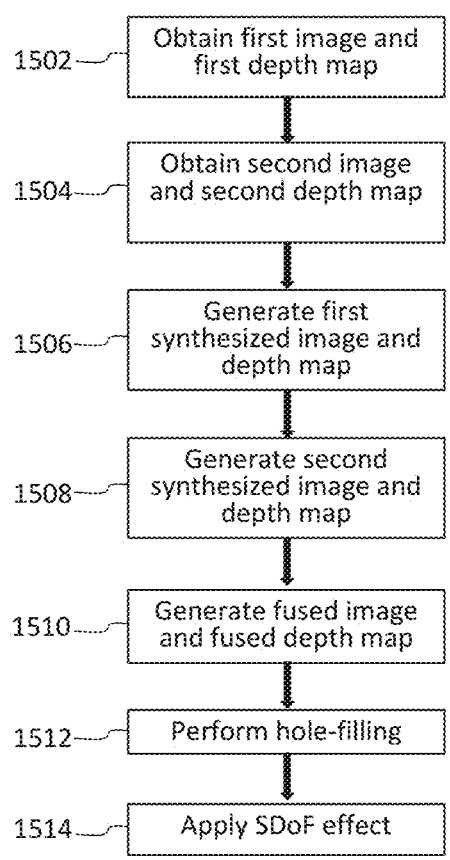
FIG. 15 is a flowchart illustrating method for providing dolly zoom view synthesis for a set up with one or more cameras, according to an embodiment of the disclosure.

FIG. 15 is a flowchart illustrating method for providing dolly zoom view synthesis for a set up with one or more cameras, according to an embodiment of the disclosure. At 1502, the present system obtains a first image and a corresponding first depth map, and at 1504, the present system obtains a second image and a corresponding second depth map. At least one of the first and second images is obtained using at least one camera of the electronic device. The first image and the second image have different FoVs. The present system generates a first synthesized image and a corresponding first synthesized depth map using the first image and the first depth map, at 1506. The present system generates a second synthesized image and a corresponding second synthesized depth map using the second image and the second depth map, at 1508. The present system generates a fused image from the first synthesized image and the second synthesized image, and the present system generates a fused depth map from the first synthesized depth map and the second synthesized depth map, at 1510. The present system performs hole-filling on the fused depth map and the fused image, at 1512. The present system applies an SDoF effect to obtain a final synthesized image with the dolly zoom effect, at 1514.

Figure 16:
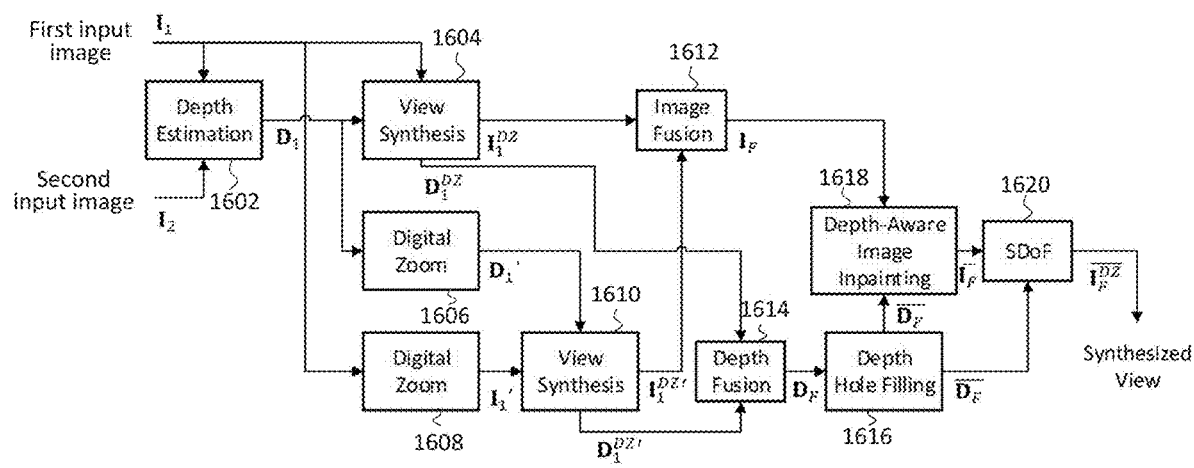
FIG. 16 is a diagram illustrating a dolly zoom view synthesis pipeline corresponding to the flowchart of FIG. 15 with a single camera setup and depth map estimation, according to an embodiment of the present disclosure.

FIG. 16 is a diagram illustrating a dolly zoom view synthesis pipeline corresponding to the flowchart of FIG. 15 with a single camera setup and depth map estimation, according to an embodiment of the present disclosure.

Two input images are provided: a first input image $I_1$ (e.g., a telephoto image) from a first camera (e.g., telephoto camera) and a second input image $I_2$ (e.g., a wide image) from a second camera (e.g., a wide view camera). The first input image $I_1$ and the second input image $I_2$ are provided to a depth estimation block 1602.

It is assumed that the depth map is obtained through a stereo depth estimation module requiring stereo input images pair ($I_1$ and $I_2$). Specifically, the depth of the second camera is found by stereo vision using an image pair (passive with 2 cameras). However, depth may also be obtained by other means in which case, the second input image $I_2$ from the second camera may not be required. For example, the depth of the second camera may be obtained by a Time of Flight (ToF) camera (active with 1 camera), as described in greater detail with respect to FIG. 20.

The first input image $I_1$ and its corresponding depth map $D_1$, from the depth estimation block 1602, are provided to a view synthesis block 1604. The depth map $D_1$ is provided to a first digital zoom block 1606, and the first input image $I_1$ is provided to a second digital zoom block 1608.

To perform dolly zoom view synthesis, the second digital zoom block 1608 and the first digital zoom block 1606 performs digital zoom on the first input image $I_1$ and the depth map $D_1$ respectively up to a certain depth FoV (DFoV) $\theta_1'$ with ($\theta_1 > \theta_1'$) to obtain a respective zoomed-in image $I_1'$ and a corresponding zoomed-in depth map $D_1'$. The zoomed-in depth map $D_1'$, which is output from the first digital zoom block 1606, and the zoomed-in image $I_1'$, which is output from the second digital zoom block 1608, are input to a view synthesis block 1610.

A synthesized image $I_1^{DZ}$, output from the view synthesis block 1604, and a synthesized zoomed-in image $I_1^{DZ1}$, output from the view synthesis block 1610, are provided to an image fusion block 1612. A synthesized depth map $D_1^{DZ}$, output from the view synthesis block 1604, and a synthesized zoomed-in depth map $D_1^{DZ1}$, output from the view synthesis block 1610, are provided to a depth fusion block 1614.

A fused depth map $D_F$, which is output from the depth fusion block 1614, is input to a depth hole filling block 1616. A fused image $I_F$, which is output from the image fusion block 1612, and a depth map after hole filling $\overline{D_F}$, which is output from the depth hole filling block 1616, are input to an image hole filling block 1618. A synthesized image $\overline{I_F}$, that is output from the image hole filling block 1618, and a depth map after hole filling $\overline{D_F}$, that is output from the depth hole filling block 1616, are input to an SDoF block 1620, which generates a synthesized image $\overline{I_F^{DZ}}$.

Figure 17A:
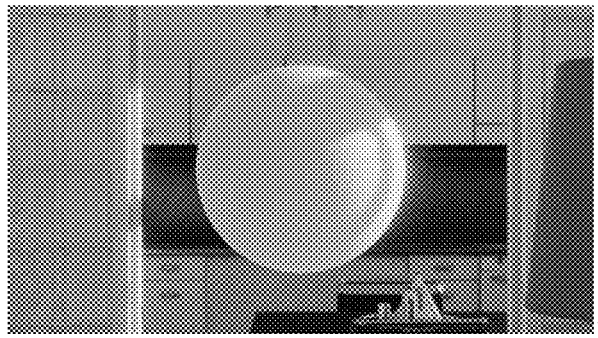
FIGS. 17A-17D illustrate an example of a single camera setup for performing dolly zoom view synthesis based on the synthesis pipeline of FIG. 16, according to an embodiment of the present disclosure.
Figure 17B:
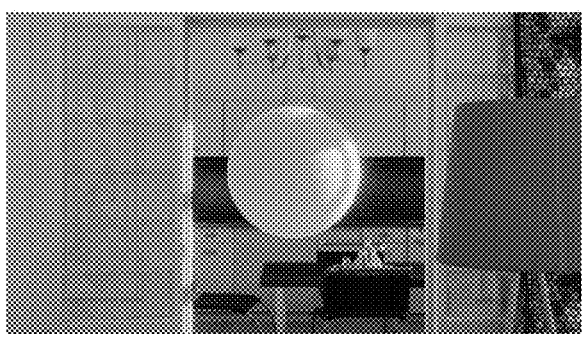
Figure 17C:
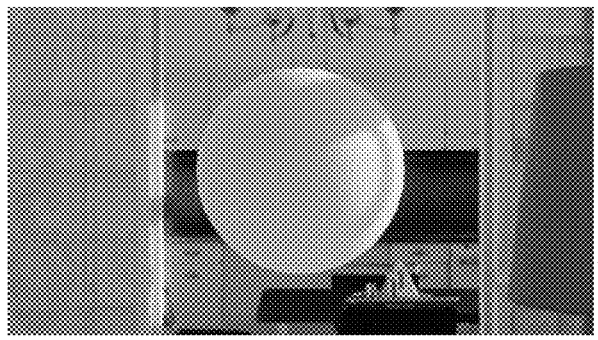
Figure 17D:
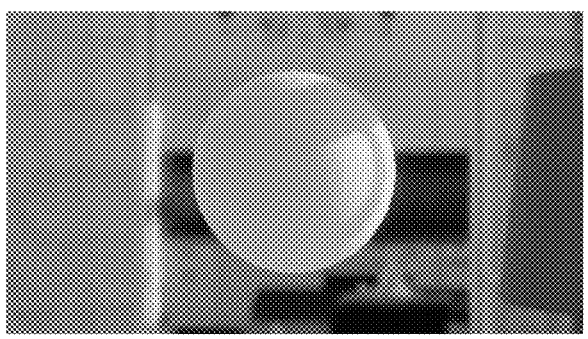

FIGS. 17A-17D illustrate an example of a single camera setup for performing dolly zoom view synthesis based on synthesis pipeline of FIG. 16. according to an embodiment of the present disclosure. FIG. 17A illustrates an input image $I_1'$ with $\theta_1'=30°$, and FIG. 17B illustrates the input image $I_1$ with $\theta_1=45°$. FIG. 17C illustrates a synthesized image $\overline{I_F}$ from the input image with $I_1'$ with $\theta_z=37.2730°$, and FIG. 17D illustrates the synthesized image $\overline{I_F^{DZ}}$ with effective $\theta_z=37.2730°$ after applying SDoF.

Figure 18:
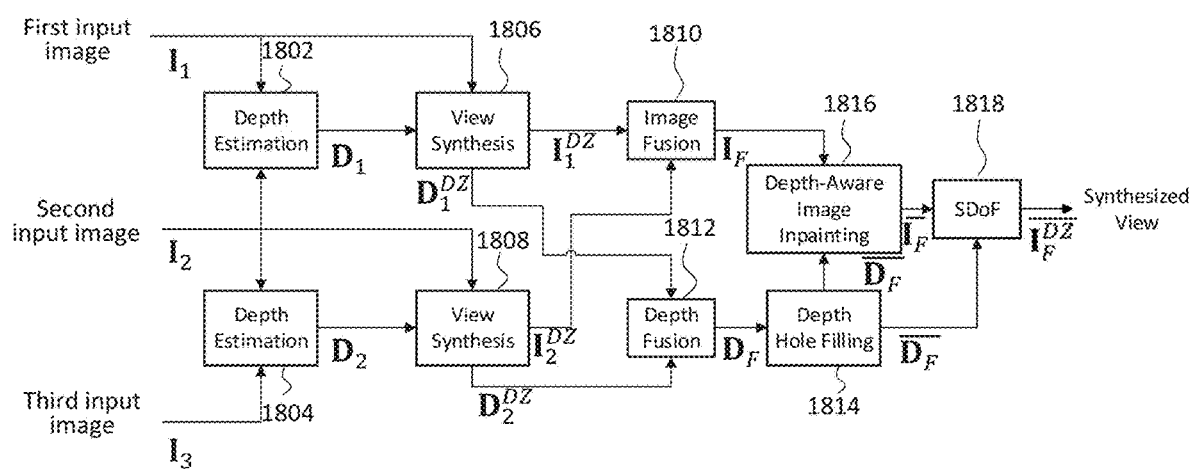
FIG. 18 is a diagram illustrating a dolly zoom view synthesis pipeline corresponding to the flowchart of FIG. 15 with a dual camera setup and depth map estimation, according to an embodiment of the present disclosure.

FIG. 18 is a diagram illustrating a dolly zoom view synthesis pipeline corresponding to the flowchart of FIG. 15 with a dual camera setup and depth map estimation, according to an embodiment of the present disclosure.

Three input images are provided: a first input image $I_1$ (e.g., a telephoto image) from a first camera (e.g., a telephoto camera), a second input image $I_2$ (e.g., a wide image) from a second camera (e.g., a wide image camera), and a third input image $I_3$ (e.g., an ultra-wide image) from a third camera (e.g., an ultra-wide image camera). The first input image $I_1$ and the second input image $I_2$ are provided to a depth estimation block 1802, and the second input image $I_2$ and the third input image $I_3$ are provided to a depth estimation block 1804.

A depth map $D_1$, which is output from the depth estimation block 1802, corresponds to the first input image $I_1$, and a depth map $D_2$, which is output from the depth estimation block 1804, corresponds to the second input image $I_2$ It may be assumed that the depth maps are obtained through stereo depth estimation modules requiring stereo input images pairs ($I_1$ and $I_2$; $I_2$ and $I_3$). However, depth maps may also be obtained by other means in which case, the third input image $I_3$ from the third camera may not be required. This is described in greater detail with respect to FIG. 22 below.

The first input image $I_1$ and its corresponding depth map $D_1$ are provided to a view synthesis block 1806. The second input image $I_2$ and its corresponding depth map $D_2$ are provided to a view synthesis block 1808. A synthesized image $I_1^{DZ}$ that is output from the view synthesis block 1806, and a synthesized image $I_2^{DZ}$ that is output from the view synthesis block 1808, are provided to an image fusion block 1810. A synthesized depth map $D_z^{DZ}$ that is output from the view synthesis block 1806, and a synthesized depth map $D_2^{DZ}$ that is output from the view synthesis block 1808, are provided to a depth fusion block 1812.

A fused depth map $D_2$ that is output from the depth fusion block 1812 is input to a depth hole filling block 1814. A fused image $I_F$ that is output from the image fusion block 1810, and a depth map after hole filling $\overline{D_F}$ that is output from the depth hole filling block 1814, are input to an image hole filling block 1816. A synthesized image $\overline{I_F}$, that is output from the image hole filling block 1816, and a depth map after hole filling $\overline{D_F}$ that is output from the depth hole filling block 1814, are input to an SDoF block 1818, which generates a synthesized image $\overline{I_F^{DZ}}$.

Figure 19A:
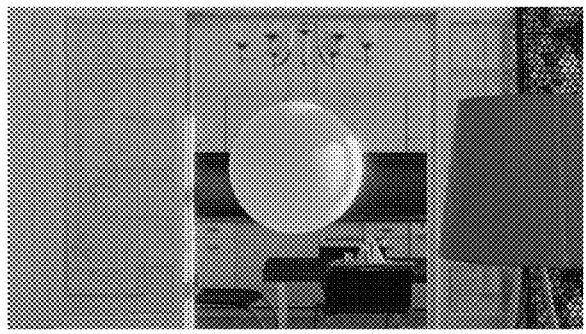
FIGS. 19A-19D illustrate an example of dual camera setup for performing dolly zoom view synthesis based on the synthesis pipeline of FIG. 18, according to an embodiment of the present disclosure.
Figure 19B:
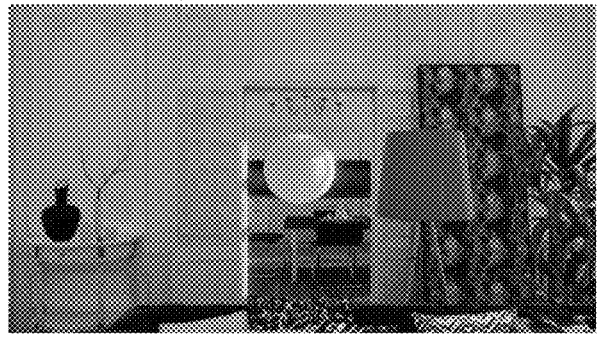
Figure 19C:
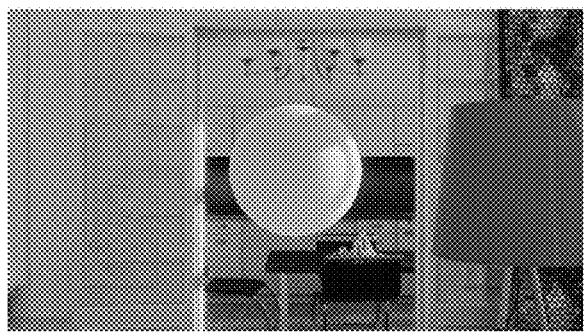
Figure 19D:
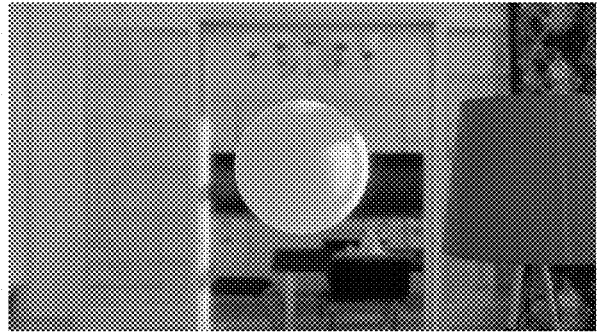

FIGS. 19A-19D illustrate an example of dual camera setup for performing dolly zoom view synthesis based on the synthesis pipeline of FIG. 18, according to an embodiment of the present disclosure. FIG. 19A illustrates the input image $I_1$ with $\theta_1=45°$, and FIG. 19B illustrates the input image $I_2$ with $\theta_2=77°$. FIG. 19C illustrates the synthesized image $\overline{I_F}$ with $\theta_z=50°$, and FIG. 19D illustrates the synthesized image $\overline{I_F^{DZ}}$ with effective $\theta_z=50°$ after applying SDoF.

Figure 20:
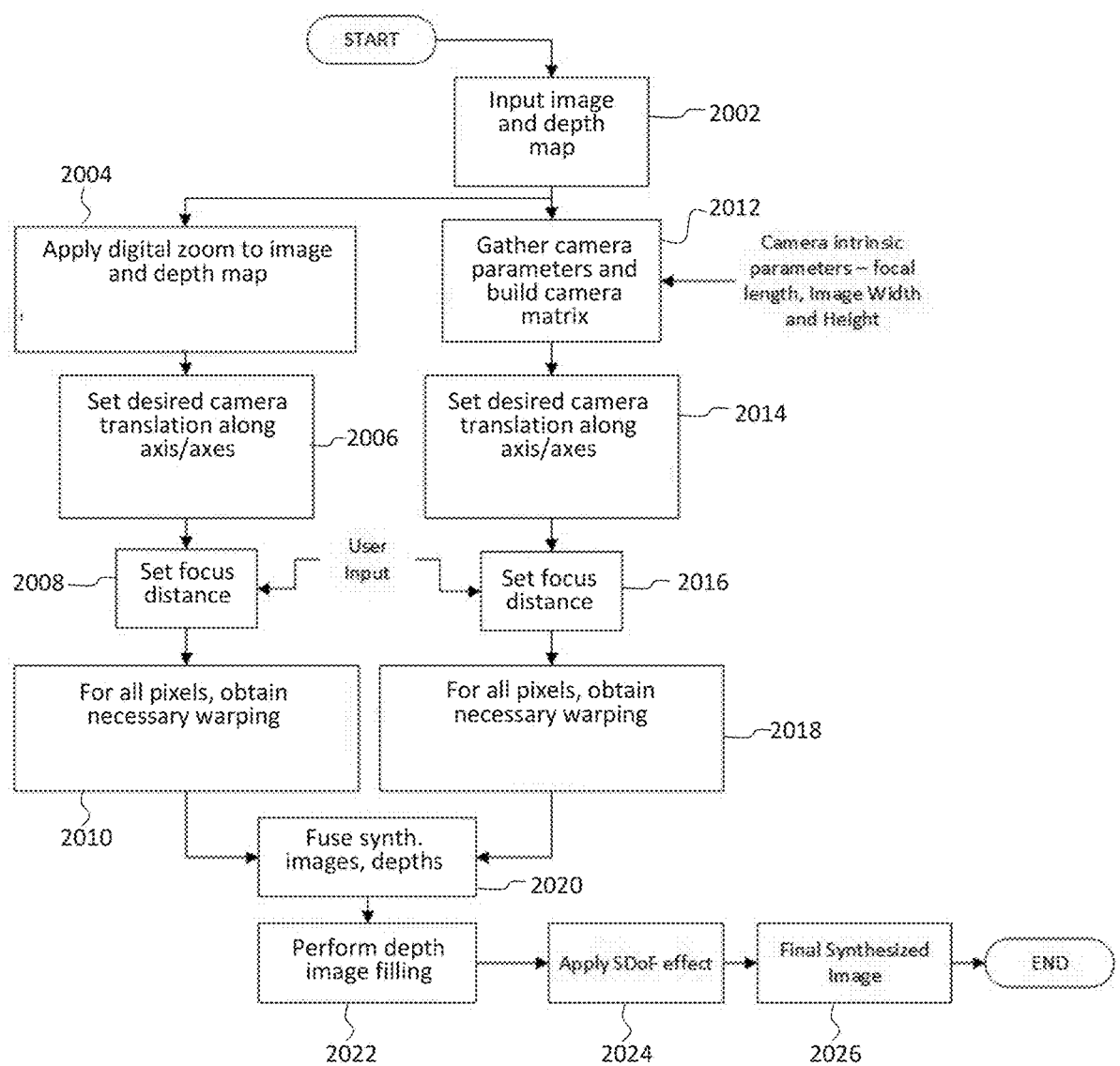
FIG. 20 is a flowchart illustrating a method for providing dolly zoom view synthesis for a single camera setup with depth map input, according to an embodiment of the present disclosure.

FIG. 20 is a flowchart illustrating a method for providing dolly zoom view synthesis for a single camera setup with depth map input, according to an embodiment of the present disclosure.

The present system receives an image and its corresponding depth map, at 2002. The present system applies digital zoom to obtain an image with a desired FoV, at 2004. The digital zoom is also applied to the depth map to obtain a zoomed-in depth. The desired FoV is less than the original FoV. The present system sets the desired camera translation along a principal axis (z), or along x, y, and z axes, at 2006. Translation along the principal axis is determined in accordance with Equation (4), while translation along the x, y, and z axes is determined in accordance with Equation (12). The present system receives a desired focus distance that is determined by user input, at 2008. For all pixels, the present system obtains the necessary warping, at 2010. Image and depth maps are warped using forward warping, as described in Equation (7) or Equation (14).

From the input image and depth map, camera parameters are gathered and a camera intrinsic matrix is built, at 2012. The camera intrinsic parameters may include focal length, image width, and image height, and the matrix is built in accordance with Equations (1)-(3). The desired camera translation along a principal axis (z), or along x, y, and z axes, is set, at 2014. Translation along the principal axis is determined in accordance with Equation (18), while translation along the x, y, and z axes is determined in accordance with Equation (26). A desired focus distance is set by user input, at 2016. For all pixels, the necessary warping is obtained, at 2018. Image and depth maps are warped using forward warping, as described in Equation (23) or Equation (28).

The present system fuses synthesized images and depths in accordance with Equations (29) and (30), at 2020, and the present system performs depth and image hole filling in accordance with Equations (31)-(35), at 2022. The present system applies the SDoF effect, at 2024, and the present system obtains a final synthesized image, at 2026.

Figure 21:
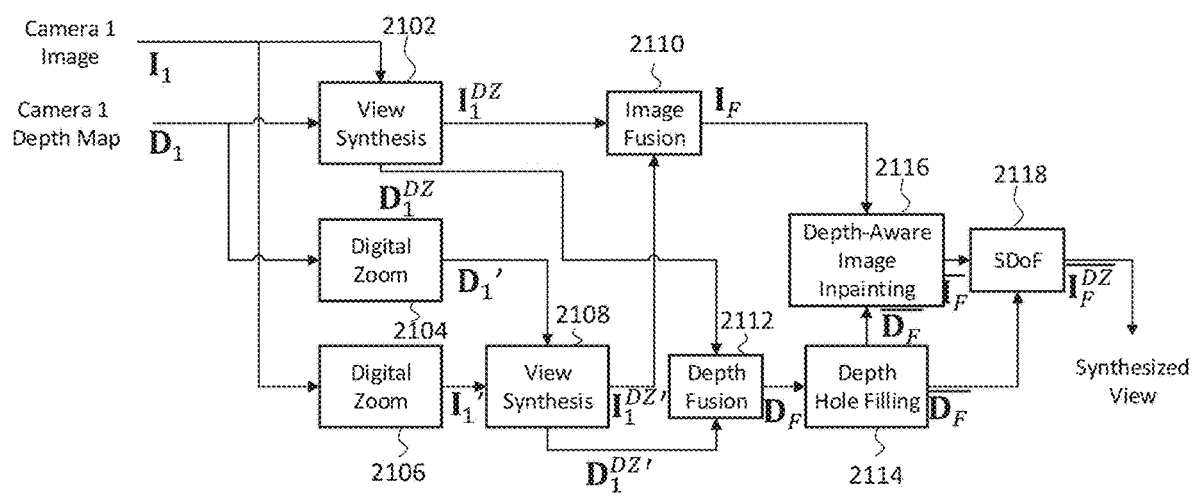
FIG. 21 is a diagram illustrating a dolly zoom view synthesis pipeline for a single camera setup based on the flowchart of FIG. 20, according to an embodiment of the present disclosure.

FIG. 21 is a diagram illustrating a dolly zoom view synthesis pipeline for a single camera setup based on the flowchart of FIG. 20, according to an embodiment of the present disclosure.

An input image, input image $I_1$ from a camera (e.g., a telephoto camera), and a corresponding depth map $D_1$, are provided. The input image $I_1$ and the depth map $D_1$ are provided to a view synthesis block 2102. The depth map $D_1$ is further provided to a first digital zoom block 2104, and the input image $I_1$ is further provided to a second digital zoom block 2106.

A zoomed-in depth map $D_1'$ that is output from the digital zoom block 2104, and a zoomed-in image $I_1'$ that is output from the digital zoom block 2106, are input to a view synthesis block 2108.

A synthesized image $I_1^{DZ}$ that is output from the view synthesis block 2102, and a synthesized image $I_1^{DZ_1}$ that is output from the view synthesis block 2108, are provided to an image fusion block 2110. A synthesized depth map $D_1^{DZ}$ that is output from the view synthesis block 2102, and a synthesized depth $D_1^{DZ_1}$ that is output from the view synthesis block 2108, are provided to a depth fusion block 2112.

A fused depth map $D_F$ that is output from the depth fusion block 2112, is input to a depth hole filling block 2114. A fused image $I_F$ that is output from the image fusion block 2110, and a depth map after hole filling $\overline{D_F}$ that is output from the depth hole filling block 2114, are input to an image hole filling block 2116. A synthesized image $\overline{I_F}$ that is output from the image hole filling block 2116, and a depth map after hole filling $\overline{D_F}$ that is output from the depth hole filling block 2114, are input to an SDoF block 2118, which generates a synthesized image $\overline{I_F}^{DZ}$.

Figure 22:
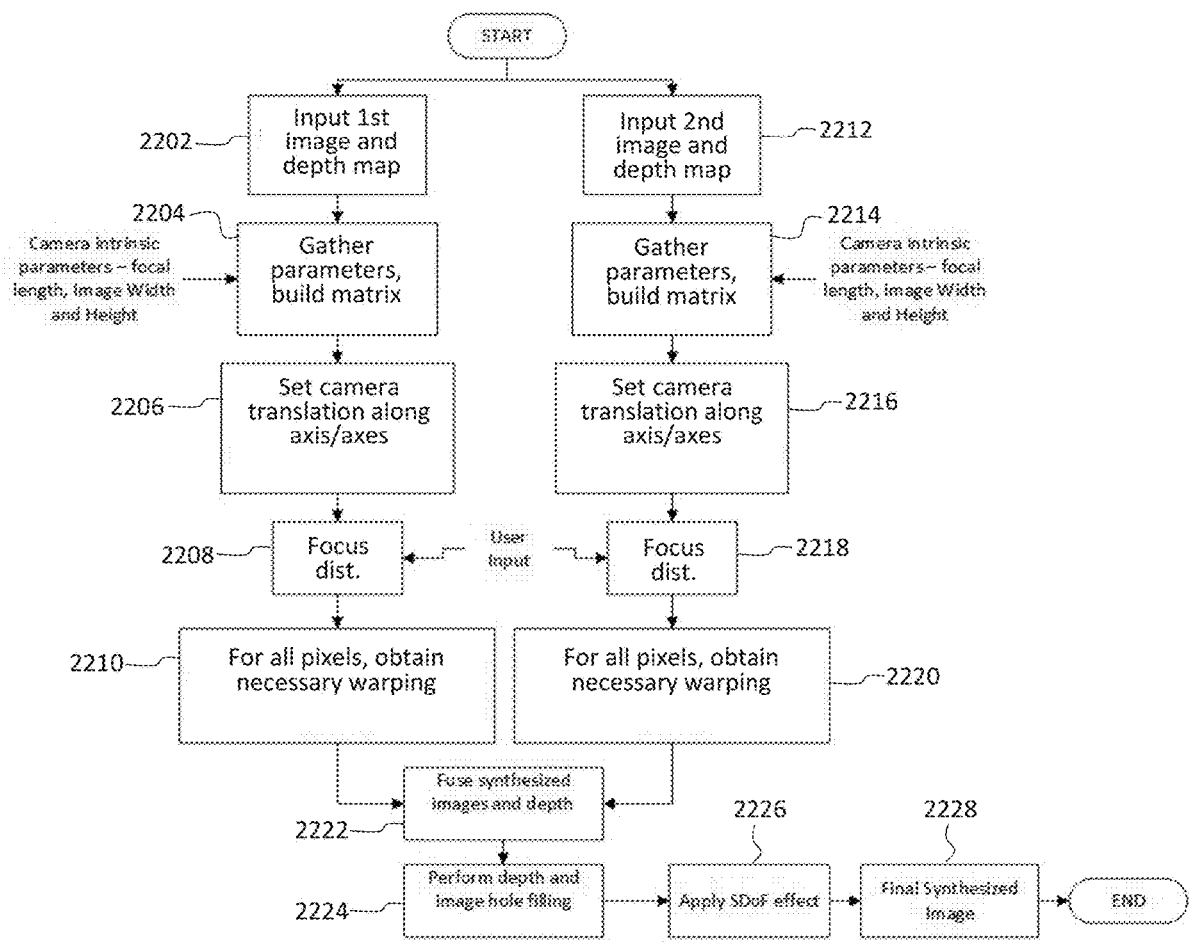
FIG. 22 is a flowchart illustrating a method for providing dolly zoom view synthesis for a dual camera setup with depth map input, according to an embodiment of the present disclosure.

FIG. 22 is a flowchart illustrating a method for providing dolly zoom view synthesis for a dual camera setup with depth map input, according to an embodiment of the present disclosure.

The present system inputs a first image and its corresponding depth map, at 2202. The present system gathers camera parameters and builds a camera intrinsic matrix, at 2204. The camera intrinsic parameters may include focal length, image width, and image height, and the matrix is built in accordance with Equations (1)-(3). The present system sets the desired camera translation along a principal axis (z), or along x, y, and z axes, at 2206. Translation along the principal axis is determined in accordance with Equation (4), while translation along the x, y, and z axes is determined in accordance with Equation (12). The present system sets a desired focus distance by user input, at 2208. For all pixels, the present system obtains the necessary warping, at 2210. Image and depth maps are warped using forward warping, as described in Equation (7) or Equation (14).

The present system inputs a second image and its corresponding depth map, at 2212. From the input image and depth map, the present system gathers camera parameters and builds a camera intrinsic matrix, at 2214. The camera intrinsic parameters may include focal length, image width, and image height, and the matrix is built in accordance with Equations (1)-(3). The present system sets the desired camera translation along a principal axis (z), or along x, y, and z axes, at 2216. Translation along the principal axis is determined in accordance with Equation (18), while translation along the x, y, and z axes is determined in accordance with Equation (26). The present system sets a desired focus distance by the user input, at 2218. For all pixels, the present system obtains the necessary warping, at 2220. Image and depth maps are warped using forward warping, as described in Equation (23) or Equation (28).

The present system fuses synthesized images and depths in accordance with Equations (29) and (30), at 2222, and the present system performs depth and image hole filling in accordance with Equations (31)-(35), at 2224. The present system applies the SDoF effect, at 2226, and the present system obtains a final synthesized image, at 2128.

Figure 23:
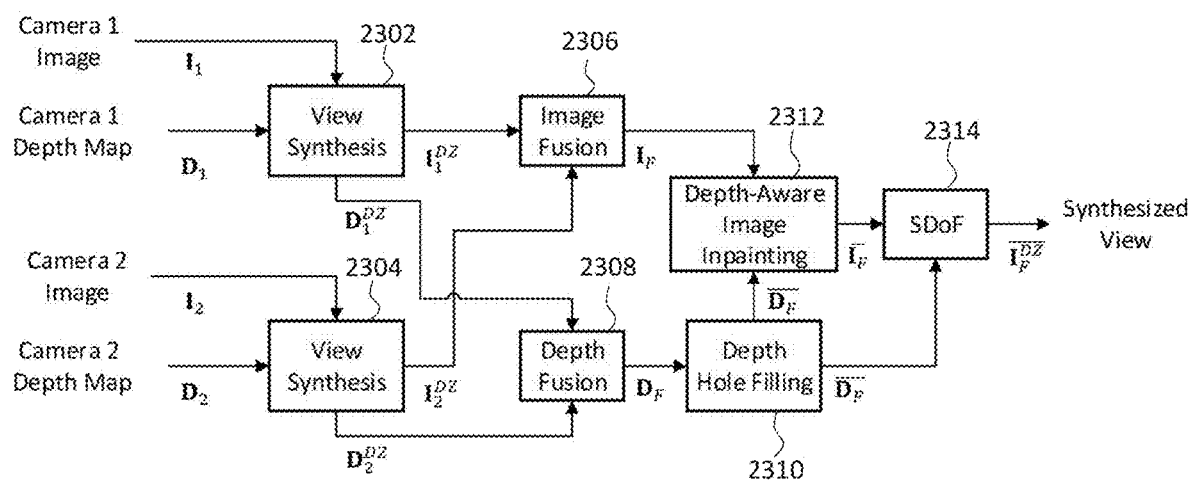
FIG. 23 is a diagram illustrating a dolly view synthesis pipeline for a dual camera setup based on the flowchart of FIG. 22, according to an embodiment of the present disclosure.

FIG. 23 is a diagram illustrating a dolly zoom view synthesis pipeline for a dual camera setup based on the flowchart of FIG. 22, according to an embodiment of the present disclosure.

A first input image $I_1$ (e.g., a telephoto image) from a first camera (e.g., a telephoto camera) with its corresponding first depth map $D_1$, and second input image $I_2$ (e.g., a wide image) from a second camera (e.g., a wide image camera) with its corresponding second depth $D_1$, are provided.

The first input image $I_1$ and the first depth map $D_1$ are provided to a first view synthesis block 2302, and the second input image $I_2$ and the second depth map $D_2$ are provided to a second view synthesis block 2304. A first synthesized image $I_1^{DZ}$, output from the first view synthesis block 2302, and a second synthesized image $I_2^{DZ}$, output from the second view synthesis block 2304, are provided to an image fusion block 2306. A first synthesized depth map $D_1^{DZ}$, output from the first view synthesis block 2302, and a second synthesized depth map $D_2^{DZ}$, output from the second view synthesis block 2304, are provided to a depth fusion block 2308.

A fused depth map $D_F$, which is output from the depth fusion block 2308, is input to a depth hole filling block 2310. A fused image $I_F$, which is output from the image fusion block 2306, and a depth map after hole filling $\overline{D_F}$, which is output from the depth hole filling block 2310, are input to an image hole filling block 2312. A synthesized image $\overline{I_F}$, which is output from the image hole filling block 2312, and the depth map after hole filling $\overline{D_F}$, which is output from the depth hole filling block 2310, are input to an SDoF block 2314, which generates a synthesized image $\overline{I_F}^{DZ}$.

Figure 24:
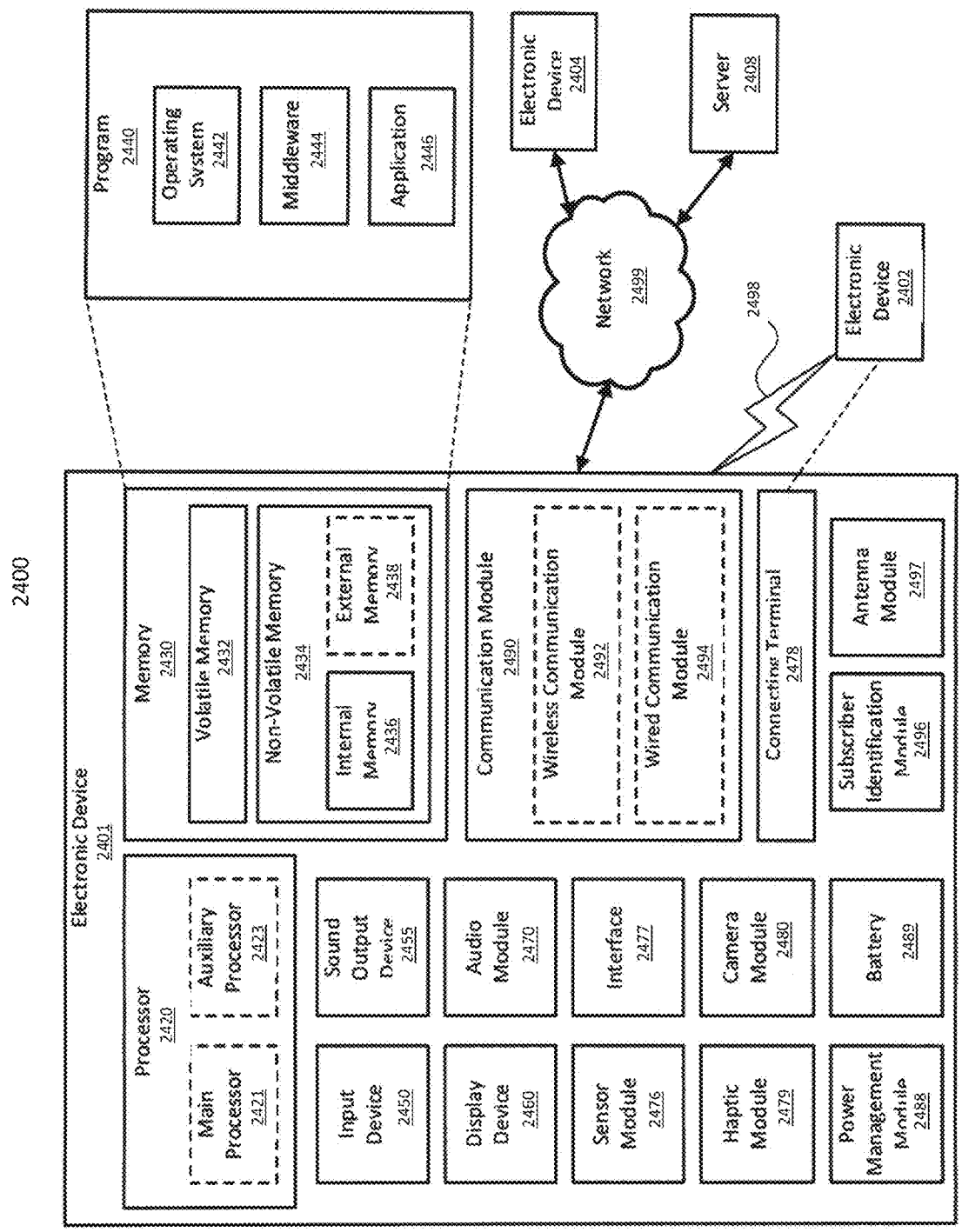
FIG. 24 is a block diagram of an electronic device in a network environment, according to one embodiment.

FIG. 24 is a block diagram of an electronic device in a network environment, according to one embodiment. Referring to FIG. 24, an electronic device 2401 in a network environment 2400 may communicate with an electronic device 2402 via a first network 2498 (e.g., a short-range wireless communication network), or an electronic device 2404 or a server 2408 via a second network 2499 (e.g., a long-range wireless communication network). The electronic device 2401 may communicate with the electronic device 2404 via the server 2408. The electronic device 2401 may include a processor 2420, a memory 2430, an input device 2450, a sound output device 2455, a display device 2460, an audio module 2470, a sensor module 2476, an interface 2477, a haptic module 2479, a camera module 2480, a power management module 2488, a battery 2489, a communication module 2490, a subscriber identification module (SIM) 2496, or an antenna module 2497. In one embodiment, at least one (e.g., the display device 2460 or the camera module 2480) of the components may be omitted from the electronic device 2401, or one or more other components may be added to the electronic device 2401. Some of the components may be implemented as a single integrated circuit (IC). For example, the sensor module 2476 (e.g., a fingerprint sensor, an iris sensor, or an illuminance sensor) may be embedded in the display device 2460 (e.g., a display).

The processor 2420 may execute, for example, software (e.g., a program 2440) to control at least one other component (e.g., a hardware or a software component) of the electronic device 2401 coupled with the processor 2420, and may perform various data processing or computations. As at least part of the data processing or computations, the processor 2420 may load a command or data received from another component (e.g., the sensor module 2476 or the communication module 2490) in volatile memory 2432, process the command or the data stored in the volatile memory 2432, and store resulting data in non-volatile memory 2434. The processor 2420 may include a main processor 2421 (e.g., a central processing unit (CPU) or an application processor (AP)), and an auxiliary processor 2423 (e.g., a graphics processing unit (GPU), an image signal processor (ISP), a sensor hub processor, or a communication processor (CP)) that is operable independently from, or in conjunction with, the main processor 2421. Additionally or alternatively, the auxiliary processor 2423 may be adapted to consume less power than the main processor 2421, or execute a particular function. The auxiliary processor 2423 may be implemented as being separate from, or a part of, the main processor 2421.

The auxiliary processor 2423 may control at least some of the functions or states related to at least one component (e.g., the display device 2460, the sensor module 2476, or the communication module 2490) among the components of the electronic device 2401, instead of the main processor 2421 while the main processor 2421 is in an inactive (e.g., sleep) state, or together with the main processor 2421 while the main processor 2421 is in an active state (e.g., executing an application). The auxiliary processor 2423 (e.g., an image signal processor or a communication processor) may be implemented as part of another component (e.g., the camera module 2480 or the communication module 2490) functionally related to the auxiliary processor 2423.

The memory 2430 may store various data used by at least one component (e.g., the processor 2420 or the sensor module 2476) of the electronic device 2401. The various data may include, for example, software (e.g., the program 2440) and input data or output data for a command related thereto. The memory 2430 may include the volatile memory 2432 or the non-volatile memory 2434.

The program 2440 may be stored in the memory 2430 as software, and may include, for example, an operating system (OS) 2442, middleware 2444, or an application 2446.

The input device 2450 may receive a command or data to be used by another component (e.g., the processor 2420) of the electronic device 2401, from the outside (e.g., a user) of the electronic device 2401. The input device 2450 may include, for example, a microphone, a mouse, or a keyboard.

The sound output device 2455 may output sound signals to the outside of the electronic device 2401. The sound output device 2455 may include, for example, a speaker or a receiver. The speaker may be used for general purposes, such as playing multimedia or recording, and the receiver may be used for receiving an incoming call. The receiver may be implemented as being separate from, or a part of, the speaker.

The display device 2460 may visually provide information to the outside (e.g., a user) of the electronic device 2401. The display device 2460 may include, for example, a display, a hologram device, or a projector and control circuitry to control a corresponding one of the display, hologram device, and projector. The display device 2460 may include touch circuitry adapted to detect a touch, or sensor circuitry (e.g., a pressure sensor) adapted to measure the intensity of force incurred by the touch.

The audio module 2470 may convert a sound into an electrical signal and vice versa. The audio module 2470 may obtain the sound via the input device 2450, or output the sound via the sound output device 2455 or a headphone of an external electronic device 2402 directly (e.g., wired) or wirelessly coupled with the electronic device 2401.

The sensor module 2476 may detect an operational state (e.g., power or temperature) of the electronic device 2401 or an environmental state (e.g., a state of a user) external to the electronic device 2401, and then generate an electrical signal or data value corresponding to the detected state. The sensor module 2476 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 2477 may support one or more specified protocols to be used for the electronic device 2401 to be coupled with the external electronic device 2402 directly (e.g., wired) or wirelessly. The interface 2477 may include, for example, a high definition multimedia interface (HDMI), a universal serial bus (USB) interface, a secure digital (SD) card interface, or an audio interface.

A connecting terminal 2478 may include a connector via which the electronic device 2401 may be physically connected with the external electronic device 2402. The connecting terminal 2478 may include, for example, an HDMI connector, a USB connector, an SD card connector, or an audio connector (e.g., a headphone connector).

The haptic module 2479 may convert an electrical signal into a mechanical stimulus (e.g., a vibration or a movement) or an electrical stimulus which may be recognized by a user via tactile sensation or kinesthetic sensation. The haptic module 2479 may include, for example, a motor, a piezoelectric element, or an electrical stimulator.

The camera module 2480 may capture a still image or moving images. The camera module 2480 may include one or more lenses, image sensors, image signal processors, or flashes.

The power management module 2488 may manage power supplied to the electronic device 2401. The power management module 2488 may be implemented as at least part of, for example, a power management integrated circuit (PMIC).

The battery 2489 may supply power to at least one component of the electronic device 2401. The battery 2489 may include, for example, a primary cell which is not rechargeable, a secondary cell which is rechargeable, or a fuel cell.

The communication module 2490 may support establishing a direct (e.g., wired) communication channel or a wireless communication channel between the electronic device 2401 and the external electronic device (e.g., the electronic device 2402, the electronic device 2404, or the server 2408) and performing communication via the established communication channel. The communication module 2490 may include one or more communication processors that are operable independently from the processor 2420 (e.g., the AP) and supports a direct (e.g., wired) communication or a wireless communication. The communication module 2490 may include a wireless communication module 2492 (e.g., a cellular communication module, a short-range wireless communication module, or a global navigation satellite system (GNSS) communication module) or a wired communication module 2494 (e.g., a local area network (LAN) communication module or a power line communication (PLC) module). A corresponding one of these communication modules may communicate with the external electronic device via the first network 2498 (e.g., a short-range communication network, such as Bluetooth™, wireless-fidelity (Wi-Fi) direct, or a standard of the Infrared Data Association (IrDA)) or the second network 2499 (e.g., a long-range communication network, such as a cellular network, the Internet, or a computer network (e.g., LAN or wide area network (WAN)). These various types of communication modules may be implemented as a single component (e.g., a single IC), or may be implemented as multiple components (e.g., multiple ICs) that are separate from each other. The wireless communication module 2492 may identify and authenticate the electronic device 2401 in a communication network, such as the first network 2498 or the second network 2499, using subscriber information (e.g., international mobile subscriber identity (IMSI)) stored in the subscriber identification module 2496.

The antenna module 2497 may transmit or receive a signal or power to or from the outside (e.g., the external electronic device) of the electronic device 2401. The antenna module 2497 may include one or more antennas, and, therefrom, at least one antenna appropriate for a communication scheme used in the communication network, such as the first network 2498 or the second network 2499, may be selected, for example, by the communication module 2490 (e.g., the wireless communication module 2492). The signal or the power may then be transmitted or received between the communication module 2490 and the external electronic device via the selected at least one antenna.

At least some of the above-described components may be mutually coupled and communicate signals (e.g., commands or data) therebetween via an inter-peripheral communication scheme (e.g., a bus, a general purpose input and output (GPIO), a serial peripheral interface (SPI), or a mobile industry processor interface (MIPI)).

Commands or data may be transmitted or received between the electronic device 2401 and the external electronic device 2404 via the server 2408 coupled with the second network 2499. Each of the electronic devices 2402 and 2404 may be a device of a same type as, or a different type, from the electronic device 2401. All or some of operations to be executed at the electronic device 2401 may be executed at one or more of the external electronic devices 2402, 2404, or 2408. For example, if the electronic device 2401 should perform a function or a service automatically, or in response to a request from a user or another device, the electronic device 2401, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 2401. The electronic device 2401 may provide the outcome, with or without further processing of the outcome, as at least part of a reply to the request. To that end, a cloud computing, distributed computing, or client-server computing technology may be used, for example.

One embodiment may be implemented as software (e.g., the program 2440) including one or more instructions that are stored in a storage medium (e.g., internal memory 2436 or external memory 2438) that is readable by a machine (e.g., the electronic device 2401). For example, a processor of the electronic device 2401 may invoke at least one of the one or more instructions stored in the storage medium, and execute it, with or without using one or more other components under the control of the processor. Thus, a machine may be operated to perform at least one function according to the at least one instruction invoked. The one or more instructions may include code generated by a complier or code executable by an interpreter. A machine-readable storage medium may be provided in the form of a non-transitory storage medium. The term "non-transitory" indicates that the storage medium is a tangible device, and does not include a signal (e.g., an electromagnetic wave), but this term does not differentiate between where data is semi-permanently stored in the storage medium and where the data is temporarily stored in the storage medium.

According to one embodiment, a method of the disclosure may be included and provided in a computer program product. The computer program product may be traded as a product between a seller and a buyer. The computer program product may be distributed in the form of a machine-readable storage medium (e.g., a compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to one embodiment, each component (e.g., a module or a program) of the above-described components may include a single entity or multiple entities. One or more of the above-described components may be omitted, or one or more other components may be added. Alternatively or additionally, a plurality of components (e.g., modules or programs) may be integrated into a single component. In this case, the integrated component may still perform one or more functions of each of the plurality of components in the same or similar manner as they are performed by a corresponding one of the plurality of components before the integration. Operations performed by the module, the program, or another component may be carried out sequentially, in parallel, repeatedly, or heuristically, or one or more of the operations may be executed in a different order or omitted, or one or more other operations may be added.

Although certain embodiments of the present disclosure have been described in the detailed description of the present disclosure, the present disclosure may be modified in various forms without departing from the scope of the present disclosure. Thus, the scope of the present disclosure shall not be determined merely based on the described embodiments, but rather determined based on the accompanying claims and equivalents thereto.

What is claimed is:

1. A method of providing a dolly zoom effect by an electronic device, the method comprising:
    obtaining a first image with a corresponding first depth map and a second image with a corresponding second depth map, wherein the first image and the second image have different fields of view;
    generating a first synthesized image and a corresponding first synthesized depth map using the first image and the first depth map respectively;
    generating a second synthesized image and a corresponding second synthesized depth map using the second image and the second depth map respectively;
    generating a fused image from the first synthesized image and the second synthesized image;
    generating a fused depth map from the first synthesized depth map and the second synthesized depth map;
    performing hole-filling on the fused depth map and the fused image; and after performing hole-filling, applying a shallow depth of field effect to the fused depth map and the fused image to obtain a third synthesized image with the dolly zoom effect.

2. The method of claim 1, wherein obtaining the first image with the corresponding first depth map and the second image with the corresponding second depth map comprises:
receiving the first image and a third image from a first camera;
determining the first depth map for the first image by performing depth estimation using the first image and the third image;
determining the second image by performing a digital zoom on the first image; and
determining the second depth map by performing a digital zoom on the first depth map.

3. The method of claim 1, wherein obtaining the first image with the corresponding first depth map and the second image with the corresponding second depth map comprises:
receiving the first image and the second image from a first camera;
receiving a third image from a second camera;
determining the first depth map by performing depth estimation using the first image and the second image; and
determining the second depth map by performing depth estimation using the second image and the third image.

4. The method of claim 1, wherein obtaining the first image with the corresponding first depth map and the second image with the corresponding second depth map comprises:
receiving the first image from a first camera;
deriving the first depth map;
determining the second image by performing a digital zoom on the first image; and
determining the second depth map by performing a digital zoom on the first depth map.

5. The method of claim 1, wherein obtaining the first image with the corresponding first depth map and the second image with the corresponding second depth map comprises:
receiving the first image from a first camera;
receiving the second image from a second camera; and
deriving the first depth map and the second depth map.

6. The method of claim 1, wherein generating the first synthesized image and the corresponding first synthesized depth map, comprises:
setting a camera translation along at least one axis for the first image;
setting a focus distance via user input; and
warping the first image and the first depth map using forward warping, based on the camera translation for the first image and the focus distance, to obtain the first synthesized image and the first synthesized depth map.

7. The method of claim 6, wherein generating the second synthesized image and the corresponding second synthesized depth map, comprises:
setting a camera translation along the at least one axis for the second image; and
warping the second image and the second depth map using forward warping, based on the camera translation for the second image and the focus distance, to obtain the second synthesized image and the second synthesized depth map.

8. The method of claim 1, wherein performing hole-filling comprises:
performing depth hole-filling using the fused depth map to obtain a hole-filled depth map; and
performing depth-aware image inpainting using the fused image and the hole-filled depth map to obtain a hole-filled image.

9. The method of claim 8, wherein performing depth-aware image inpainting comprises:
updating an occlusion mask based on each of a plurality of unique depth values in the hole-filled depth map; and
applying a window averaging filter for occluded areas in the fused image according to the updated occlusion mask.

10. The method of claim 8, wherein the shallow depth of field effect is applied using the hole-filled image and the hole-filled depth map.

11. An electronic device, comprising:
at least one camera;
a processor, which, upon instructions being executed, is caused to:
obtain a first image with a corresponding first depth map and a second image with a corresponding second depth map, wherein the first image and the second image have different fields of view;
generate a first synthesized image and a corresponding first synthesized depth map using the first image and the first depth map respectively;
generate a second synthesized image and a corresponding second synthesized depth map using the second image and the second depth map respectively;
generate a fused image from the first synthesized image and the second synthesized image;
generate a fused depth map from the first synthesized depth map and the second synthesized depth map;
perform hole-filling on the fused depth map and the fused image; and
after performing hole-filling, apply a shallow depth of field effect to the fused depth map and the fused image to obtain a third synthesized image with a dolly zoom effect.

12. The electronic device of claim 11, wherein, in obtaining the first image with the corresponding first depth map and the second image with the corresponding second depth map, the instructions further cause the processor to:
receive the first image and a third image from a first camera;
determine the first depth map for the first image by performing depth estimation using the first image and the third image;
determine the second image by performing a digital zoom on the first image; and
determine the second depth map by performing a digital zoom on the first depth map.

13. The electronic device of claim 11, wherein, in obtaining the first image with the corresponding first depth map and the second image with the corresponding second depth map, the instructions further cause the processor to:
receive the first image and the second image from a first camera;
receive a third image from a second camera;
determine the first depth map by performing depth estimation using the first image and the second image; and
determine the second depth map by performing depth estimation using the second image and the third image.

14. The electronic device of claim 11, wherein, in obtaining the first image with the corresponding first depth map and the second image with the corresponding second depth map, the instructions further cause the processor to:
receive the first image from a first camera;
derive the first depth map;

determine the second image by performing a digital zoom on the first image; and determine the second depth map by performing a digital zoom on the first depth map.

15. The electronic device of claim 11, wherein, in obtaining the first image with the corresponding first depth map and the second image with the corresponding second depth map, the instructions further cause the processor to:

receive the first image from a first camera;

receive the second image from a second camera; and derive the first depth map and second depth map.

16. The electronic device of claim 11, wherein, in generating the first synthesized image and the corresponding first synthesized depth map, the instructions further cause the processor to:

set a camera translation along at least one axis for the first image;

set a focus distance via user input; and warp the first image and the first depth map using forward warping, based on the camera translation for the first image and the focus distance, to obtain the first synthesized image and the first synthesized depth map.

17. The electronic device of claim 16, wherein, in generating the second synthesized image and the corresponding second synthesized depth map, the instructions further cause the processor to:

set a camera translation along the at least one axis for the second image; and warp the second image and the second depth map using forward warping, based on the camera translation for the second image and the focus distance, to obtain the second synthesized image and the second synthesized depth map.

18. The electronic device of claim 11, wherein, in performing hole-filling, the instructions further cause the processor to:

perform depth hole-filling using the fused depth map to obtain a hole-filled depth map; and perform depth-aware image inpainting using the fused image and the hole-filled depth map to obtain a hole-filled image.

19. The electronic device of claim 18, wherein, in performing depth-aware image inpainting, the instructions further cause the processor to:

update an occlusion mask based on each of a plurality of unique depth values in the hole-filled depth map; and apply a window averaging filter for occluded areas in the fused image according to the updated occlusion mask.

20. The electronic device of claim 18, wherein the shallow depth of field effect is applied using the hole-filled image and the hole-filled depth map.

* * * * *